US012770422B2

(12) United States Patent
Krion et al.

(10) Patent No.: US 12,770,422 B2
(45) Date of Patent: Oct. 20, 2026

(54) METHOD AND DEVICE FOR SCANNING MULTIPLE DOCUMENTS FOR FURTHER PROCESSING

(71) Applicant: AMADEUS S.A.S., Biot (FR)

(72) Inventors: Paul Krion, Biot (FR); Swagat Parida, Bangalore (IN); Renjith Karimattathil Sasidharan, Cochin (IN); Martin Von Schledorn, Biot (FR); Sebastian Bildner, Biot (FR); Ruthwik Rudresh, Bangalore (IN); Thomas Stark, Biot (FR); Patrick Mentz, Biot (FR); Ralf Schippmann, Biot (FR); Rajesh Ramshetty Siddaraju, Bangalore (IN)

(73) Assignee: AMADEUS S.A.S., Biot (FR)

( * ) Notice: Subject to any disclaimer, the term of this patent is extended or adjusted under 35 U.S.C. 154(b) by 259 days.

(21) Appl. No.: 18/716,199

(22) PCT Filed: Oct. 10, 2022

(86) PCT No.: PCT/EP2022/078130
§ 371 (c)(1),
(2) Date: Jun. 4, 2024

(87) PCT Pub. No.: WO2023/110186
PCT Pub. Date: Jun. 22, 2023

(65) Prior Publication Data

US 2025/0037491 A1 Jan. 30, 2025

(30) Foreign Application Priority Data

Dec. 16, 2021 (EP) .................................... 21306796

(51) Int. Cl.
*G06V 30/146* (2022.01)
*G06V 30/148* (2022.01)

(52) U.S. Cl.
CPC .......... *G06V 30/146* (2022.01); *G06V 30/153* (2022.01)

(58) Field of Classification Search
CPC .... G06V 30/146; G06V 30/153; G06V 10/25; G06V 10/82
See application file for complete search history.

(56) References Cited

U.S. PATENT DOCUMENTS 6,816,857 B1 11/2004 Weissman et al.
9,721,394 B2 8/2017 Rosenthal et al.
(Continued)

FOREIGN PATENT DOCUMENTS

WO 2014009786 A1 1/2014
WO 2016126665 A1 8/2016

OTHER PUBLICATIONS

Bhardwaj et al., Augmented paper system; A framework for User's Personalized Workspace, 2013, 4th National Conference on Computer Vision, Pattern Recognition, Image Processing and Graphics, pp. 1-5. (Year: 2013).*

(Continued)

*Primary Examiner* — Kathleen M Broughton
(74) *Attorney, Agent, or Firm* — PERRY + CURRIER INC.

(57) ABSTRACT

A method of scanning paper document(s) for further processing includes filming/displaying a scene on a user device and recognizing the document(s), identifying corner point coordinates of the document(s) using a multi-layer convolutional neural network, building a frame around each of the recognized paper document(s) using the corner point coordinates and mapping these coordinates to an augmented reality engine's coordinate system and highlighting the document(s) on the user device's display by a highlighted object frame around each document. The user is guided by commands to move the user device to a scanning position to (Continued)

take a picture of the document(s) with a resolution, object coverage, sharpness suitable for further processing of the at least one paper document, and a picture of at least one of the paper document(s) is automatically taken when the user device has arrived at said scanning position, the picture being transmitted for further processing.

16 Claims, 20 Drawing Sheets

(56) References Cited

U.S. PATENT DOCUMENTS

| | | | | |
|---|---|---|---|---|
| 2009/0061901 | A1 | 3/2009 | Arrasvuori et al. | |
| 2013/0033484 | A1* | 2/2013 | Liao | G06T 7/246<br>345/419 |
| 2014/0288981 | A1 | 9/2014 | Rajkarnikar et al. | |
| 2017/0366744 | A1 | 12/2017 | Cudak et al. | |
| 2021/0034856 | A1* | 2/2021 | Torres | G06V 10/82 |
| 2021/0256680 | A1* | 8/2021 | Xie | G06N 3/084 |

OTHER PUBLICATIONS

Rahman et al., Cloud Based Information Retrieval Device for Augmentation of Real Time Images, 2018, IEEE Int. Conference on Electronics, Computing and Communication Technologies, pp. 1-7. (Year: 2018).*

Das et al., DewarpNet: Single-Image Document Unwarping With Stacked 3D and 2D Regression Networks, 2019, IEEE/CVF Int. Conference on Computer Vision, pp. 1-11. (Year: 2019).*

Mojcent, "All in one place—Loyalty+ Marketing + Coupons", mojcent.com, date unknown, Retrieved from the Internet on Jun. 5, 2024 from URL: https://web.archive.org/web/20230401081334/https://mojcent.com/en/.

Matrix Media Services, "Receipt advertising", matrix media services, Jan. 18, 2013, Available from the Internet at URL: https://www.matrixmediaservices.com/receipt-advertising-2/.

Breuel, Thomas M. "Two geometric algorithms for layout analysis." Document Analysis Systems V: 5th International Workshop, DAS 2002 Princeton, NJ, USA, Aug. 19-21, 2002 Proceedings 5. Springer Berlin Heidelberg, 2002.

Breuel, Thomas M. "An algorithm for finding maximal whitespace rectangles at arbitrary orientations for document layout analysis." Seventh International Conference on Document Analysis and Recognition, 2003. Proceedings.. IEEE, 2003.

Muo, "The 7 Best Scanner Apps for Android and iPhone", makeuseof.com, Jan. 18, 2022. Retrieved from the Internet on Jun. 6, 2024 from URL https://www.makeuseof.com/tag/mobile-document-scanner-apps/.

International Search Report, mailed Feb. 3, 2023, issued in corresponding PCT application No. PCT/EP2022/078130, Filed Oct. 10, 2022.

Pan Runqiu, et al.: "Multi-document detection via corner localization and association", Neurocomputing, Elsevier, Masterdam , NL, vol. 466, Sep. 28, 2021.

YOLO9000: Better, Faster, Stronger by Joseph Redmon, Ali Farhadi, University of Washington, Allen Institute for AI (arXiv: 1612.08242v1 [cs.CV] Dec. 25, 2016).

* cited by examiner

METHOD AND DEVICE FOR SCANNING MULTIPLE DOCUMENTS FOR FURTHER PROCESSING

FIELD OF THE INVENTION

The present invention generally is related to a method and device for scanning multiple documents for further processing, in particular, to extract information therefrom.

The document YOLO9000: Better, Faster, Stronger by Joseph Redmon, Ali Farhadi, University of Washington, Allen Institute for AI (arXiv: 1612.08242v1 [cs.CV] 25 Dec. 2016), relates to real time object-detection, capable of detecting various object categories and applied to pictures.

SUMMARY OF THE INVENTION

According to first aspect, a method of scanning one or more paper documents for further processing is provided, the method comprising: filming and displaying a scene on a display of a user device, recognizing a presence of one or more paper documents in the scene, identifying corner point coordinates for each of the recognized paper documents using a multi-layer convolutional neural network. The method further comprises: building a frame around each of the one or more recognized paper documents using said identified corner point coordinates of the one or more recognized paper documents as corner points of the built frame, and mapping the corner point coordinates of the one or more recognized paper documents to a 3D coordinate system of an augmented reality engine and highlighting the one or more recognized documents on the display of the user device by displaying a highlighted object frame around each recognized paper document using means of the augmented reality engine. The method further comprises: guiding a user of the user device by displayed commands, generated via the augmented reality engine, to move the user device to a scanning position in which at least one picture of at least one of the one or more paper documents can be taken with a resolution, object coverage and sharpness suitable for further processing of the at least one paper document, automatically taking a picture of at least one of the paper documents when the user device has been moved to said position to which the user is guided, and transmitting the picture taken from the at least one of the paper documents to a module for further processing.

According to a second aspect, a mobile user device to scan one or more paper documents for further processing is provided, the user device comprising at least one processor and at least one non-volatile memory comprising at least one computer program with executable instructions stored therein, the executable instructions, when executed by the at least one processor, cause the at least one processor to: film and display a scene on a display of a user device, recognize a presence of one or more paper documents in the scene, identify corner point coordinates for each of the one or more recognized paper documents using a multi-layer convolutional neural network. The processor is further caused to: build a frame around each of the one or more recognized paper documents using said identified corner point coordinates of the one or more recognized paper documents as corner points of the built frame, to map the corner point coordinates of the recognized paper documents to a 3D coordinate system of an augmented reality engine and highlight the one or more recognized documents on the display of the user device by displaying a highlighted object frame around each recognized paper document using means of the augmented reality engine, as well as to guide a user of the user device by displayed commands, generated via the augmented reality engine, to move the user device to a filming position in which at least one picture of at least one of the one or more paper documents can be taken with a resolution, object coverage and sharpness suitable for further processing of the at least one paper document, automatically take a picture of at least one of the paper documents when the user device has been moved to said position to which the user is guided, and transmit the picture taken from the at least one of the paper documents to a module for further processing.

According to a third aspect, a computer program product comprising program code instructions stored on a computer readable medium to execute the method steps according to the first aspect, when said program is executed on a computer device.

GENERAL DESCRIPTION, ALSO OF SUPPLEMENTARY EXAMPLES

According to first aspect, a method of scanning one or more paper documents for further processing is provided, the method comprising: filming and displaying a scene on a display of a user device, recognizing a presence of one or more paper documents in the scene. The scene is, for example, the field of view of the camera of a user device. The user device may be a stationary device like a PC or a scanning station, or a portable device like a tablet computer, smartphone etc. In any case, the user device has a camera and is adapted either to send data to external computer resources for further processing or has enough computation power to perform the further processing of the paper documents filmed and scanned. The recognition of the one or more paper documents may be performed using a specifically trained multi-layer convolutional neural network, such as YOLOv2, tiny-YOLO etc.

The method comprises identifying corner point coordinates for each of the one or more recognized paper documents using a multi-layer convolutional neural network. Using said identified corner point coordinates a frame is built around each of the recognized paper documents with those corner point coordinates as corner points of the frame. Put differently, the task of the multi-layer convolutional neural network is given a picture produced by filming/photographing the one or more recognized paper documents, to find polygons which correspond to the paper boundaries of the document—wherein the corner points of said polygons are given by said corner point coordinates.

Only the content confined by these frame polygons may be used for further processing of the document. Hence, algorithms for further processing are applied only on this part of a scene and not on any background parts. Thereby the performance of further processing procedures like OCR (optical character recognition) is increased, meaning that less processing power is required to perform background subtraction and also the accuracy of the method is increased since the processed content of the frame does not include any further material that should not be scanned and could irritate the OCR algorithm.

Furthermore, based on the frame identified, the orientation of the paper document in the scene can be estimated and corrected for-so that a picture of a rectangular document rotated relative to the scene is not delivered to a further processing step with lines of its written content being rotated relative to a scanning space of a further processing module, for example, an OCR method.

The method comprises mapping the corner point coordinates of the recognized paper document(s) to a 3D (three-dimensional) coordinate system of an augmented reality engine. The 3D coordinate system might be a part of an augmented reality (AR) 3D plane with trackable object map. The augmented reality engine hosting said AR 3D plane may be provided by the current AR kit of Apple® or Google®. Thus, the mapping of the corner point coordinates identified by the multi-layer convolutional network to the 3D coordinate system of the augmented reality engine may be provided by the following kit and related classes/methods:

1. Google ARCore for Android®, in particular public class HitResult and method getDistance( ).
2. Google ARCore for Android®, in particular class Frame and method hitTestInstantPlacement-xPx-yPy-approximateDistanceMeters, In some examples, mapping the corner point coordinates of the recognized paper document(s) to the 3D coordinate system of an augmented reality engine comprises adding a spatial Z coordinate to two-dimensional X, Y coordinates of the corner points for the recognized paper document(s) received by the augmented reality engine, wherein the spatial Z coordinate is determined and added such that the highlighted object frame displayed to the user is aligned with the paper document boundaries displayed to the user. The Z coordinate may be added automatically when using the above-mentioned augmented reality kits.

The method further comprises highlighting the recognized document(s) on the display of the user device by displaying a highlighted object frame around each recognized paper document using means of the augmented reality engine. Once the 3D coordinates in the AR 3D coordinate system (trackable object map) are known, virtual highlighted object frames around the displayed paper document (s) can be created by joining those 3D coordinates in the AR map to form an illuminated three-dimensional polygon around the paper document(s) to be scanned, which is displayed on the user device's display. These highlighted object frames show the user which paper document(s) in the scene have indeed been identified by the method and where those paper document(s) is/are located in space. The highlighted object frames may be of different color for different paper documents or may all be of the same color. The method may allow the user to click on single highlighted object frames to select a sub-group of the identified paper documents for further processing. The method may further allow the user to manually adjust the highlighted object frame displayed.

The highlighted object frames render more visible to the user which documents of a plurality of documents are to be scanned in the field of view of the camera and enable the user to select which documents are to be scanned and further processed, for example, by clicking on the frames. This provides flexibility to the overall method since also after the object detection step, the user can decide which documents should be scanned and which documents should not be scanned.

The method further comprises guiding a user of the user device by displayed commands, generated via the augmented reality engine, to move the user device to a scanning position in which at least one picture of at least one of the two or more paper documents can be taken with a resolution, object coverage and sharpness suitable for further processing of the at least one paper document. Generating the displayed commands by the augmented reality engine means here that the augmented reality engine projects an overlayer into the scene on the screen.

A resolution, object coverage and/or sharpness suitable for further processing may be reached if a paper document to be scanned covers at least 70%, 80% or 90% of the scene to be photographed and if taking a photo of the document with a resolution of at least five megapixels is possible. The sharpness is, for example, required to be as high that an optical character recognition algorithm (OCR) can be applied to letters/figures/strings on the paper document. The same criterion of being capable of OCR recognition may also be applied to the resolution and object coverage at the scanning position.

The user may be guided to the scanning position by displaying commands projected to the field of view displayed. These commands may be implemented by presenting arrows on the screen indicating the direction in which the user should move the device, or verbal commands, such as "move closer", "move further away", "zoom in", "zoom out" etc., "scanning position reached" are displayed.

The method continues by automatically taking a picture of at least one of the paper documents when the user device has been moved to said position to which the user is guided, and transmitting the picture taken from the at least one of the paper documents to a module for further processing. The module for further processing is, for example, located on the same device as the camera used for taking the picture or the module for further processing may be located on at least one server on the internet programmed to perform the further processing task.

Automatically taking a picture when the above-mentioned pre-requisites are given prevents the user from taking pictures that may not be a suitable input for the further processing. To provide an example, it would otherwise not be guaranteed that OCR functions properly if the document only covers a fraction of the picture taken. This has the effect of improving the reliability of the overall scanning process.

In addition, automatically taking the picture saves time in the overall scanning process, if a plurality of documents is scanned successively. When the picture is taken automatically, in the background, the picture can already be sent to a module for further processing, although there are still other documents to scan.

In addition to the function of automatically taking a picture when said pre-requisites are fulfilled, the user may have the capability to trigger the scan manually as well.

In some examples, the above-mentioned user device is a smartphone equipped with a camera. For example, the device is a smartphone with a camera resolution of more than 10 megapixels and a pre-installed augmented reality kit which is used for providing the functions of the above-mentioned augmented reality engine.

The paper document(s) on which the method is applied may be receipt(s). The method may be applied on a plurality of receipts belonging to a single business trip as a first step of collecting all relevant data associated with the business trip in a single session. As such, all the total amounts of the receipts could be read out in order to provide refunds for the money spent. However, the method of scanning a paper document for further processing described herein could be applied to any other type of paper document. To provide an example, the method could be applied to eventually read out details from a data sheet for a semiconductor switch, a motor, a generator or any other document used in engineering, solid state physics or material science. Furthermore, the method could be used to read out the result of a COVID 19 test, an HIV test or reading out specific values of blood exams.

In some examples, the method is used for scanning two or more paper documents for further processing. Hence, all the method steps described in this document may be carried out for scanning two or more paper documents for further processing.

In some examples, the further processing of the paper documents comprises extracting characters and/or strings from the scanned document, by applying optical character recognition and semantic analysis on the picture taken. The optical character recognition could be performed by various different software components, such as OCRKit for MAC OS® or iOS® or OCR cloud software Kit by Google®. The semantic analysis may be performed by applying n-gram models and/or hidden Markov models on the characters identified by the OCR method. The further processing may be performed using a recurrent neural network model to build bounding boxes around areas of interest, such as price fields of different receipts and OCR software to extract the values. In this way, for example, the price fields of a plurality of receipts (e.g. four receipts) can be read out in a single scan session, in which the user scans all the receipts either successively or simultaneously and bounding box building around areas of interest and/or OCR recognition can be applied asynchronously on one picture transmitted while the scan of a second document is still ongoing.

Furthermore, empty (e.g. white) or relatively unimportant areas of a receipt (e.g. serial number area) and the shape thereof may be identified. Therefore, a machine learning model may be trained on example images of documents to determine empty or unimportant areas, i.e., parts of the document that are not relevant for the further processing. This trained machine learning model, which may, in one embodiment, be a bidirectional recurrent neural network that classifies the detected areas into specific text and other space (e.g., QR code, white space etc.) blocks, can then be applied while scanning the documents with the user device or while or after extracting relevant information.

The thereby detected irrelevant areas can then be used to present other relevant content to the user via the augmented reality engine. For example, the user may be presented with weather forecast or latest news, with advertisements, or any other relevant information. The relevant content may be fetched from the Internet and/or dedicated to the user. Moreover, for presenting the relevant content with the augmented reality engine, the relevant information may be analyzed, selected and/or formatted to fit into the white space or unimportant area, and perspective corrections may be made if applicable.

In some examples, the multi-layer convolutional neural network architecture for identifying the corner point coordinates while scanning the document(s) comprises a YOLO v2 object detection layer, which is designed to identify object characteristics of the one or more objects to be scanned, said object characteristics including said corner point coordinates for the one or more recognized paper documents.

Although the following explanation relates to a YOLO neural network architecture, the method of scanning one or more paper documents for further processing described herein may be carried out using other neural networks with a different architecture. An example for such a neural network architecture would be based on MobileNet, which could perform the method as well after adapting the architecture to the use case of scanning one or more documents for further processing by specific training of said MobileNet based neural network.

The multi-layer convolutional neural network is made up of convolutional layers only. This leads to the model being independent of the input image size. Hence, a neural network model that has already been trained based on a specific input image size (e.g. 64×48 RGB images) can, for example, be used for differently shaped input images without retraining. The decision layer of the multi-layer convolutional neural network may be the final layer of said network. This layer is, for example, preceded by a backend model for converting an RGB input image with a layer depth of "3" (R, G, B) and a length and width of e.g. 64×48 to a layer providing less surface information but more depth information, e.g. a layer with a length and width of 16×12, but a depth of e.g. 512. This backend model may be succeeded by a frontend model with the purpose of reshaping the frontend model (e.g. 12×16×N) into the shape required by the YOLOv2 layer sections and also said YOLOv2 decision layer (e.g. 12×17×70).

The decoded output of the YOLO decision layer is, for example, according to the method a list of attributes including the object class (paper), the probability that the object indeed fits the class "paper", the coordinates of a bounding box around the document (x, y, w, h)—wherein the bounding box in general is not aligned with paper document orientation nor exactly fits the boundaries of the paper document but rather defines a broad area in which the paper document is located—and the above-mentioned corner point coordinates (ax, ay, bx, by, cx, cy, dx, dy). These tuples together may define a YOLO object.

In some examples, a training data set is used to train the multi-layer convolutional neural network that comprises objects that are members of a paper document class and objects that are not of a paper document class.

Thus, for example, when training the multi-layer convolutional network algorithm, objects are presented to the algorithm that are similar to documents of the paper document class but are indeed no paper documents, such as a paper napkin, leaves, pieces of linen etc., in order to single out probable false positive results.

In some examples, the multi-layer convolutional neural network is trained with a training set including paper documents, wherein the paper documents are distorted and/or positioned arbitrarily in the field of view plane of the camera and/or before different backgrounds, and/or wherein the paper documents are crumpled. To provide a further example, also paper documents (e.g. receipts) that are not of rectangular shape are presented to the algorithm, or documents that are partly folded-rotated relative to the field of view, placed slantwise in space and so forth.

The training set used may be enlarged by means of augmentation, where the training documents are programmatically turned, panned, zoomed in/out and/or colored, which further increases the number of training documents many times with each iteration.

Choosing such different training data sets that each deal with different possible mis-identification problems, makes the machine learning method based on the convolutional neural network more robust and prevents frames from being drawn around documents that cannot be used for further processing at all or from which a character extraction would not be possible.

In the course of the learning process, polygons corresponding to the paper boundaries and comprising the corner points of the paper documents are, for example, placed manually on images of the paper documents to provide actually correct solutions to the convolutional neural network algorithm used in the training of the algorithm.

The training process includes backpropagation steps in which weights and/or activation functions/activation thresholds, architecture parameters, learning rates etc. are adjusted over 1000 to 10 000 iterations. Typically, for example, up to 2000 documents are part of a training set, wherein 90% of the objects/documents are used for the actual training and the remaining 10% of the objects/documents are used for validating the neural network parameters obtained during the training. The range of 2000 documents may be increased some-fold via augmentation of the documents.

In some examples, the method further comprises post-processing the pictures automatically taken before transmitting, wherein the post-processing comprises: accommodating for misalignments of the picture taken relative to the scene, and/or adapting brightness and/or contrast and/or saturation of the picture taken, and/or sharpening the picture taken. The post-processing, for example, also includes optical filters applying customized filter functions.

In some examples, the method further comprises calculating a score value for each of the recognized paper documents, the score value being indicative of the probability that the recognized paper document is a paper document and not another type of object. Hence, for example, this score value would be 90% to 100% for a paper document (depending, for example, on distortion and/or image quality) and e.g. 1 to 5% for a paper napkin, a book, a leaf etc. As mentioned above, this score value is, for example, one of the tuples that define a YOLO object and is provided as an output of the YOLOv2 decision layer.

In some embodiments, the displayed commands guide the user to move the user device to individual scanning positions for each single paper document successively, and wherein automatically taking a picture comprises, when the individual scanning position for a document is reached, taking a picture from the paper document.

As mentioned above, the command displayed to the user, to move to said individual scanning positions successively may be displayed by projecting commands like "scan of first receipt finished, now move to receipt number two" or, for example, by projecting arrows indicating the direction in which the camera should be moved next, on the live images captured by the camera.

The displayed commands may be based on the score value calculated for each paper document and guide the user to move the user device to the individual scanning positions for the paper documents in descending order of the score value. In this way, a command could be displayed to the user that indicates to first scan the paper document with the highest score value.

In some examples, the order of documents to be scanned by the user is displayed on the user device's display by means of number symbols projected into the highlighted object frames of the recognized documents to be scanned, wherein the projection is performed by the augmented reality engine using the mapped frame coordinates to project the number symbols to a distinct position within the highlighted object frame.

In this way, a number symbol "1" may be projected, for example, to the center of the highlighted object frame around a paper document—in order to indicate to the user that this paper document should be scanned first and the user should move the camera to a scanning position for this document. The position of the center of said object frame (corresponding to the physical center of the paper document) may be calculated based on the above-described 3D corner frame coordinates utilized by the augmented reality engine.

Taking the picture automatically when the individual scanning position has been reached could be triggered by the scanning device constantly measuring parameters like sharpness, resolution, brightness, object coverage and so forth, and triggering the photo shot as soon when at least a subset of these parameters is within a range that is sufficient to enable further processing of the picture.

In some examples, the displayed commands guide the user to move the user device to an overall scanning position for two or more paper documents at the same time.

The overall scanning position is a scanning position in which a picture of two or more paper documents can be taken at the same time. The further processing of the paper documents may then also be applied to all the paper documents simultaneously. The overall scanning position is, for example, also determined by criteria like sharpness, object coverage, resolution achievable and suitable for enabling the further processing of the document etc. The user commands projected to the display by means of the augmented reality may include: "move closer", "move further away", "move to the left", "move to the right" etc.

In some examples, a decision is taken whether to display commands to guide the user to move the scanning device to individual scanning positions for each document to be scanned successively or to a common overall scanning position for two or more documents to be scanned simultaneously based on the maximum possible resolution of the scanning device's camera. To provide an example, if a camera device with a maximum resolution of less than five megapixels is identified, the user is commanded to move to individual scanning positions for the documents successively, so that one document can be scanned after the other-if a camera with a maximum resolution of more than five megapixels is identified, the user is commanded to move to an overall scanning position so that two or more documents can be scanned simultaneously.

According to a second aspect, a mobile user device to scan one or more paper documents for further processing is provided, the user device comprising at least one processor and at least one non-volatile memory comprising at least one computer program with executable instructions stored therein, the executable instructions, when executed by the at least one processor, cause the at least one processor to: film and display a scene on a display of a user device, recognize a presence of one or more paper documents in the scene, identify corner point coordinates for each of the one or more recognized paper documents using a multi-layer convolutional neural network. The processor is further caused to: build a frame around each of the one or more recognized paper documents using said identified corner point coordinates of the one or more recognized paper documents as corner points of the built frame, to map the corner point coordinates of the one or more recognized paper documents to a 3D coordinate system of an augmented reality engine and highlight the one or more recognized documents on the display of the user device by displaying a highlighted object frame around each recognized paper document using means of the augmented reality engine, as well as to guide a user of the user device by displayed commands, generated via the augmented reality engine, to move the user device to a filming position in which at least one picture of at least one of the one or more paper documents can be taken with a resolution, object coverage and sharpness suitable for further processing of the paper document(s), automatically take a picture of at least one of the paper documents when the user device has been moved to said position to which the user is guided, and transmit the picture taken from the at least one of the paper documents to a module for further processing.

According to a third aspect, a computer program product comprising program code instructions stored on a computer readable medium to execute the method steps according to the first aspect, when said program is executed on a computer device.

BRIEF DESCRIPTION OF THE DRAWINGS

Examples of the invention are now described, also with reference to the accompanying drawings, wherein.

The drawings and the description of the drawings are of examples of the invention and are not of the invention itself. Like reference signs refer to like elements throughout the following description of examples.

DESCRIPTION OF EXAMPLES

Figure 1:
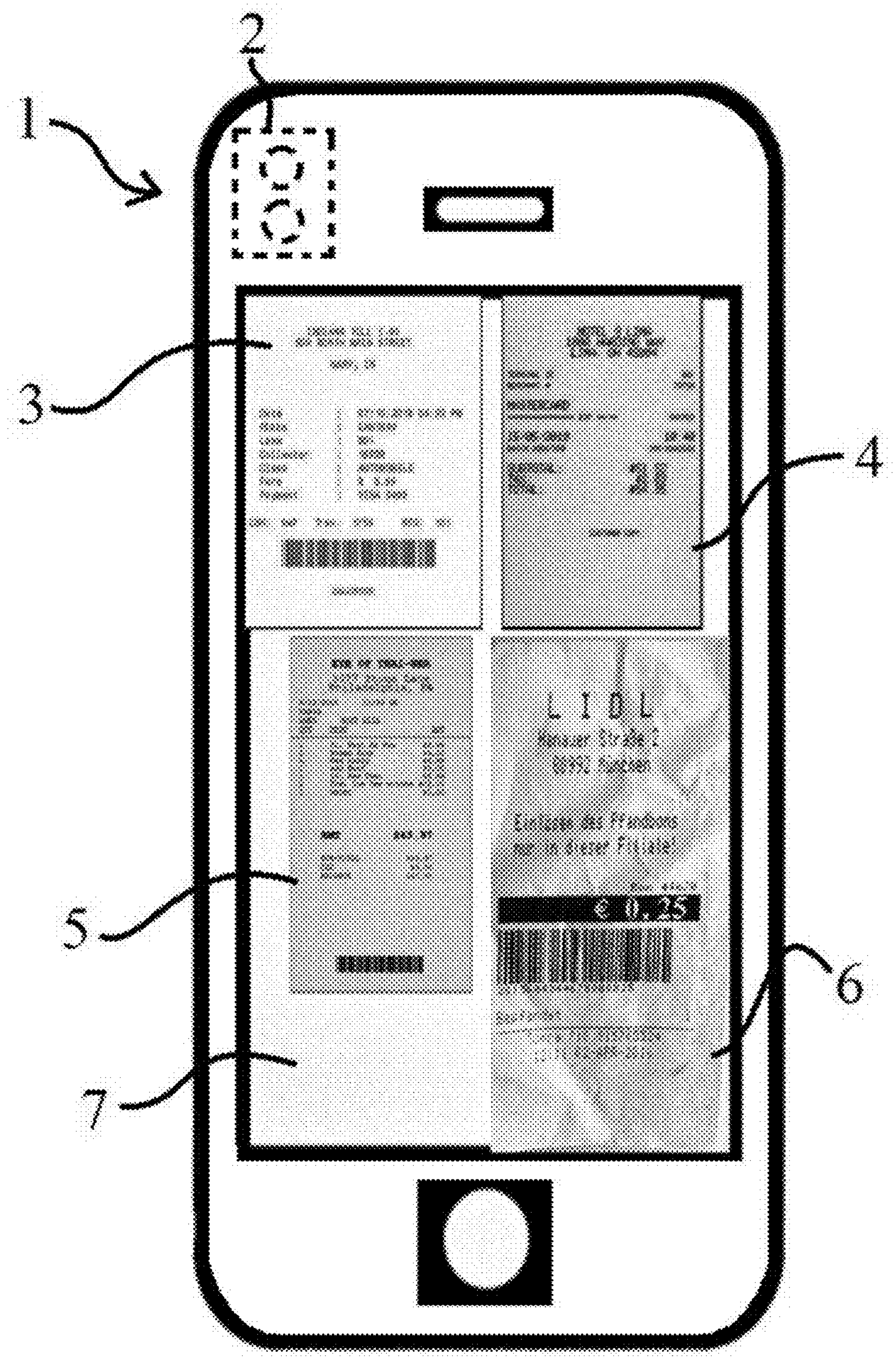
FIG. 1 shows an example of a mobile device scanning four receipts in order to carry out the method further described in FIGS. 2 to 18.

An example of a mobile device 1 scanning four receipts 3, 4, 5, 6 in order to carry out the method further described in FIGS. 2 to 18 is given by FIG. 1.

Although the examples described in this section are directed to the identification and scanning of receipts, as mentioned above, the method of scanning a paper document for further processing described herein could be applied to any other type of paper document. To provide an example, the method could be applied to eventually read out details from a data sheet for a semiconductor switch, a motor, a generator or any other document used in engineering, solid state physics or material science. Furthermore, the method could be used to read out the result of a COVID 19 test, an HIV test or reading out specific values of blood exams.

The mobile device 1 is equipped with a camera 2 and a display 7. The mobile device 1 displays four receipts 3, 4, 5, 6 on its display 7, for example, via an app that carries out the method of scanning two or more documents for further processing.

Figure 2:
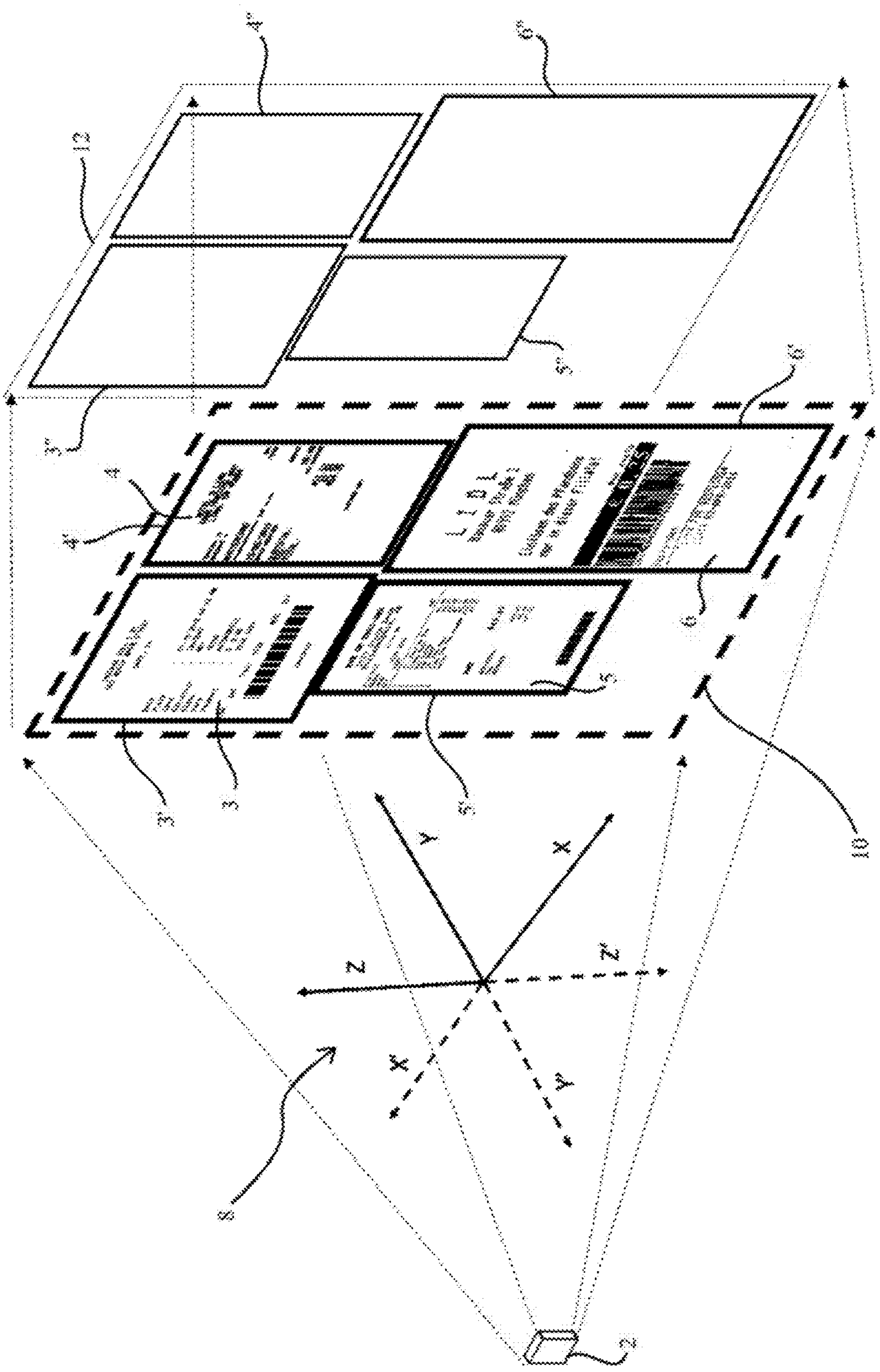
FIG. 2 is a schematic illustration of examples of frames constructed around the four receipts and the projection of these frames to an augmented reality plane.

A schematic illustration of examples of frames constructed around the four receipts and the projection of these frames to an augmented reality plane is given by FIG. 2.

Pictures filmed by the camera 2 are used to construct a frame around each of the detected receipts 3, 4, 5, 6. More specifically, the frames 3', 4', 5', 6' marking the boundaries of receipt 3, 4, 5, 6, respectively are built by means of a multi-layer convolutional neural network. The frames 3', 4', 5', 6' are constructed by a multi-layer frame detection method, which is also explained in conjunction with FIGS. 2, 11, 13, 14, and defined by coordinates in frame detection layer 10. Based on these frames 3', 4', 5', 6' on the frame detection layer 10, an augmented reality engine 201 (see FIG. 11) maps the two-dimensional frames 3', 4', 5', 6' to three-dimensional object frames 3", 4", 5", 6" on a 3D augmented reality trackable object map 12 via said augmented reality engine 201 to be displayed as highlighted object frames 3", 4", 5", 6" in the scene on display 7 (see FIG. 1).

Figure 3:
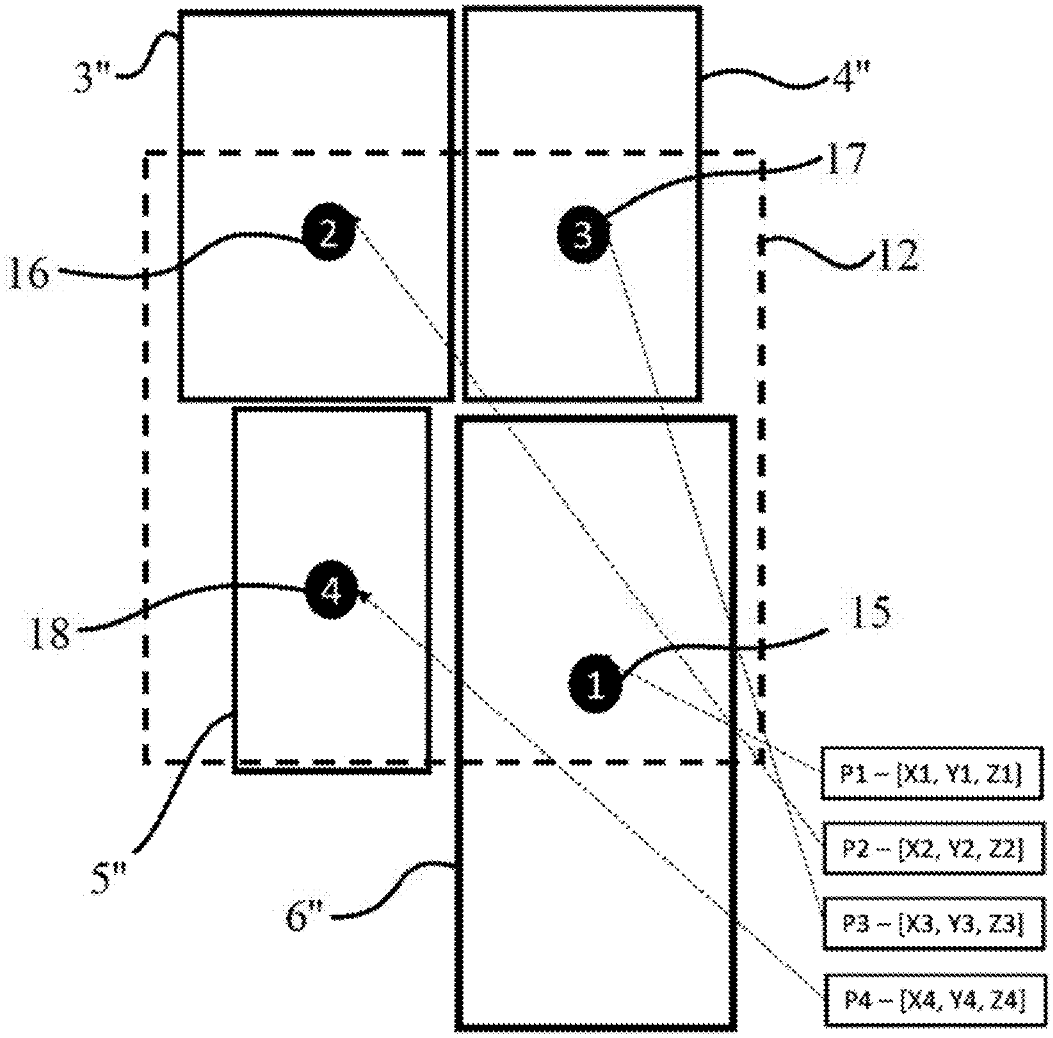
FIG. 3 illustrates examples of highlighted object frames displayed by the augmented reality engine with numbers displayed in their center.

Examples of object frames displayed as highlighted object frames by the augmented reality engine with numbers displayed in their center are shown in FIG. 3. The object frames 3", 4", 5", 6" may each identify a trackable object on said 3D augmented reality trackable object map 12. The number symbols 15, 16, 17, 18, represent the order of receipts to be scanned in this example. The number symbols 15, 16, 17, 18 are projected by means of the augmented reality engine to center point coordinates of the object frames 6", 3", 4", 5".

Figure 4:
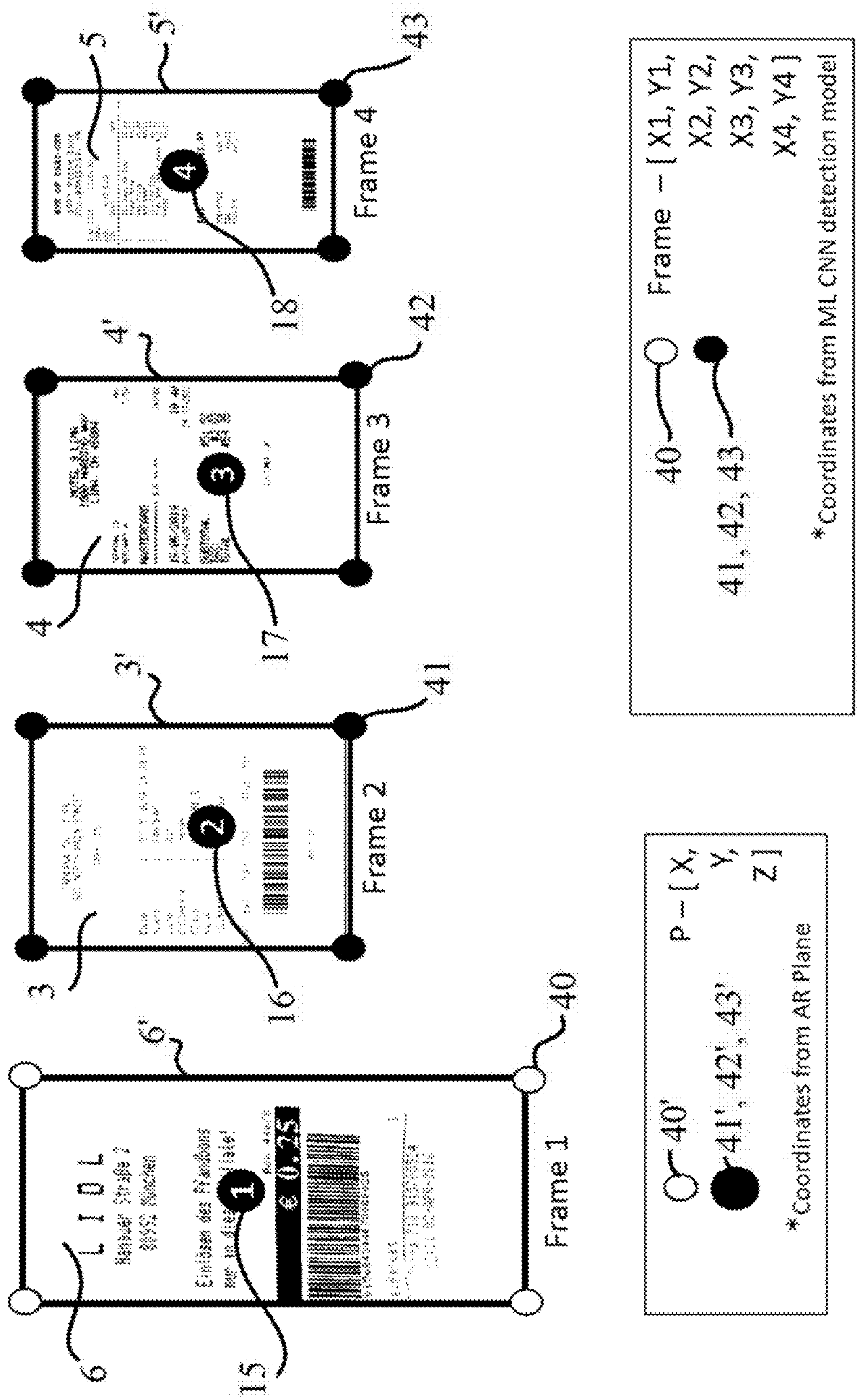
FIG. 4 shows examples of frames constructed for the receipts to be scanned and the identified corner point coordinates of these frames.

FIG. 4 shows examples of the frames 3', 4', 5', 6'-built by joining corner point coordinates 40, 41, 42, 43 identified by the multi-layer convolutional neural network. The frame 6' "Frame 1" built around receipt 6 is built by identifying the corner point coordinates 40 of the frame 6'. Likewise, frames 3' "Frame 2", 4' "Frame 3" and 5' "Frame 4" are built by identifying the corner points 41, 42, 43, respectively.

Thus, each frame 2', 3', 4', 6' is defined by a tuple of coordinates [X1, Y1, X2, Y2, X3, Y3, X4, Y4]. Please note that the corner point coordinates 40, 41, 42, 43 identified by the multi-layer neural network are two-dimensional in this example. The corner point coordinates 40, 41, 42, 43 are then mapped to three dimensional coordinates 40', 41', 42', 43' P [X, Y, Z], for example, by adding the Z coordinate of the corner points in the field of view of the camera by the augmented reality engine. Those three-dimensional corner coordinates 40', 41', 42', 43' are used by the augmented reality engine to display the highlighted object frame around the receipts on the user's display.

Figure 5:
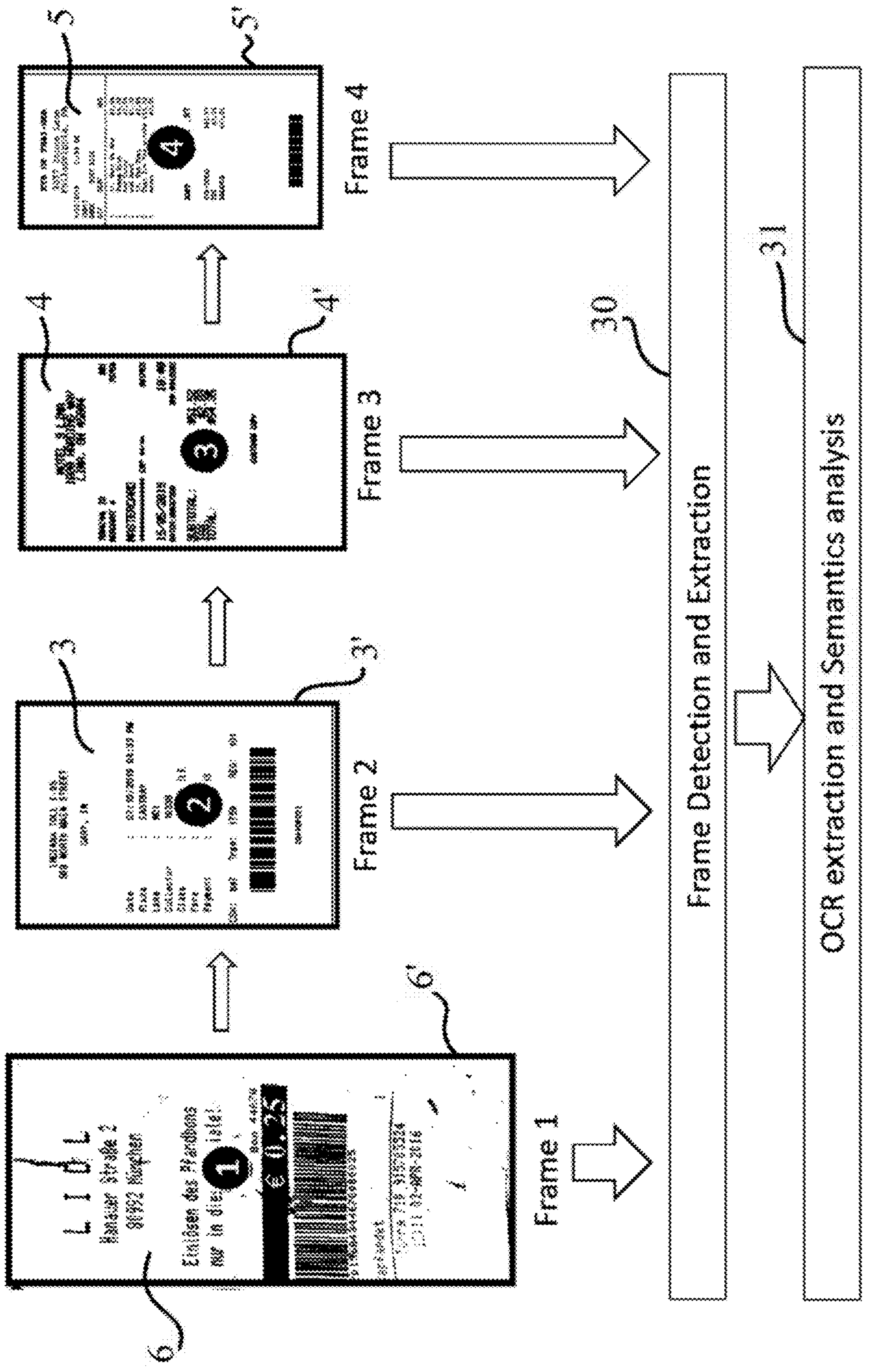
FIG. 5 shows an example of how to further proceed with the receipts after the frames have been identified.

An example of how to further proceed with the receipts after the frames have been identified is shown in FIG. 5. The frames 6', 3', 4' and 5' surround the paper documents 6, 3, 4, and 5 respectively. After the frame detection and extraction of the corner point coordinates 30, OCR extract and semantics analysis 31 are applied on the receipts enclosed by the frames, after a picture of the receipts within these frames has been taken and may have been sent to an OCR extraction and semantics analysis module.

Figure 6:
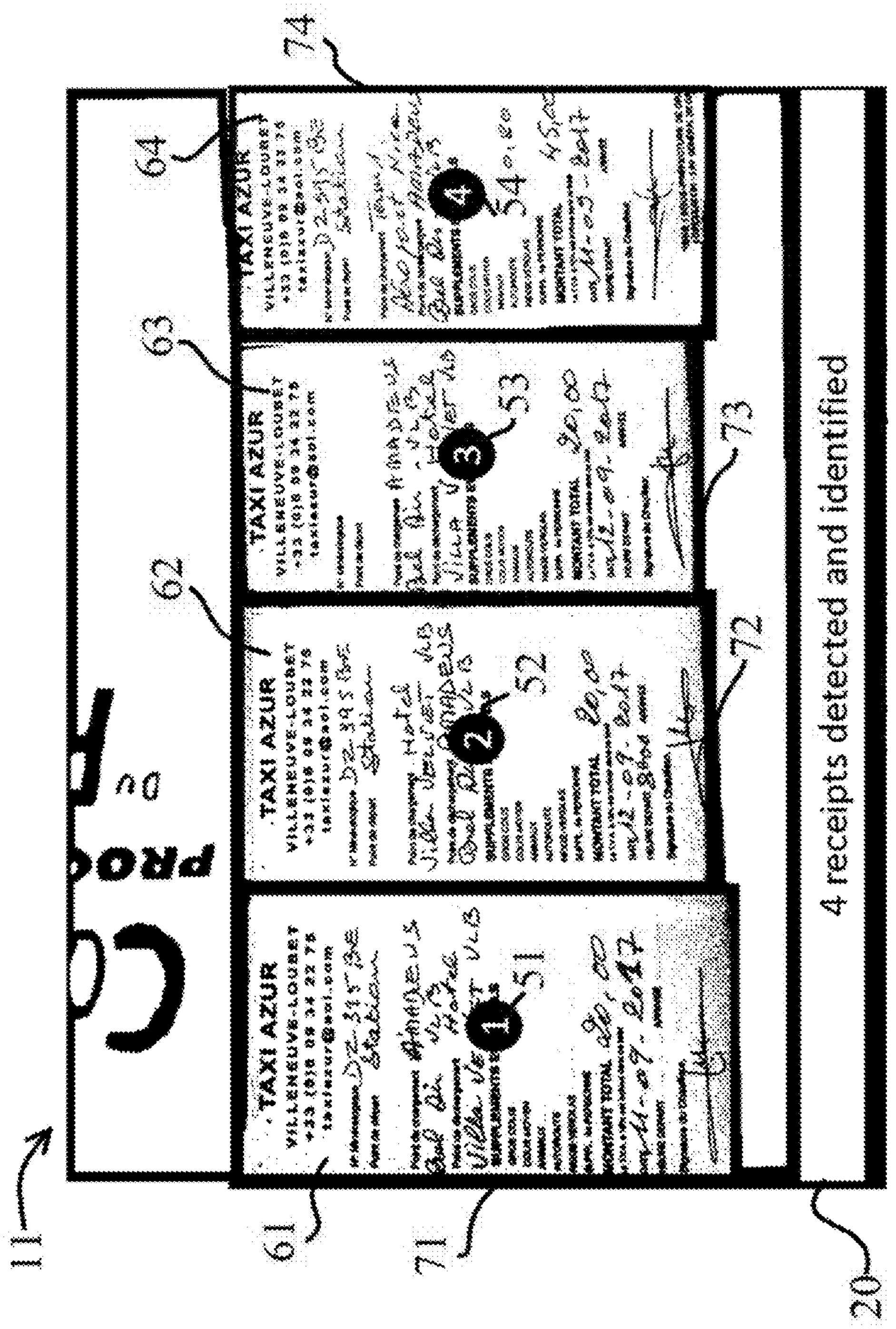
FIG. 6 shows an example of a screen on a user device when scanning four receipts, indicating that four receipts were detected and identified.

An example of a screen 11 on a user device 1 (see FIG. 1) when scanning four receipts 61, 62, 63, 64, indicating that four receipts were detected and identified, is shown in FIG. 6.

Four receipts 61, 62, 63, 64 from the taxi company "TAXI AZUR" are displayed, surrounded by highlighted object frames 71, 72, 73 and 74. The receipts 61, 62, 63, 64 are, for example, identified as non-identical and number symbols "1", "2", "3", "4" 51, 52, 53, 54 are displayed in order to indicate to the user which frame 71, 72, 73, and 74 belongs to which receipt 61, 62, 63, 64 and, for example, to indicate the order in which the receipts 61, 62, 63, 64 should be scanned.

By an output line 20 on the screen 11, the user is informed by the message "4 receipts detected and identified" that four receipts have been detected and identified. The user may now choose by clicking or tapping on one or more of the displayed highlighted object frames, with which of the identified object frames the method should proceed further.

Figure 7:
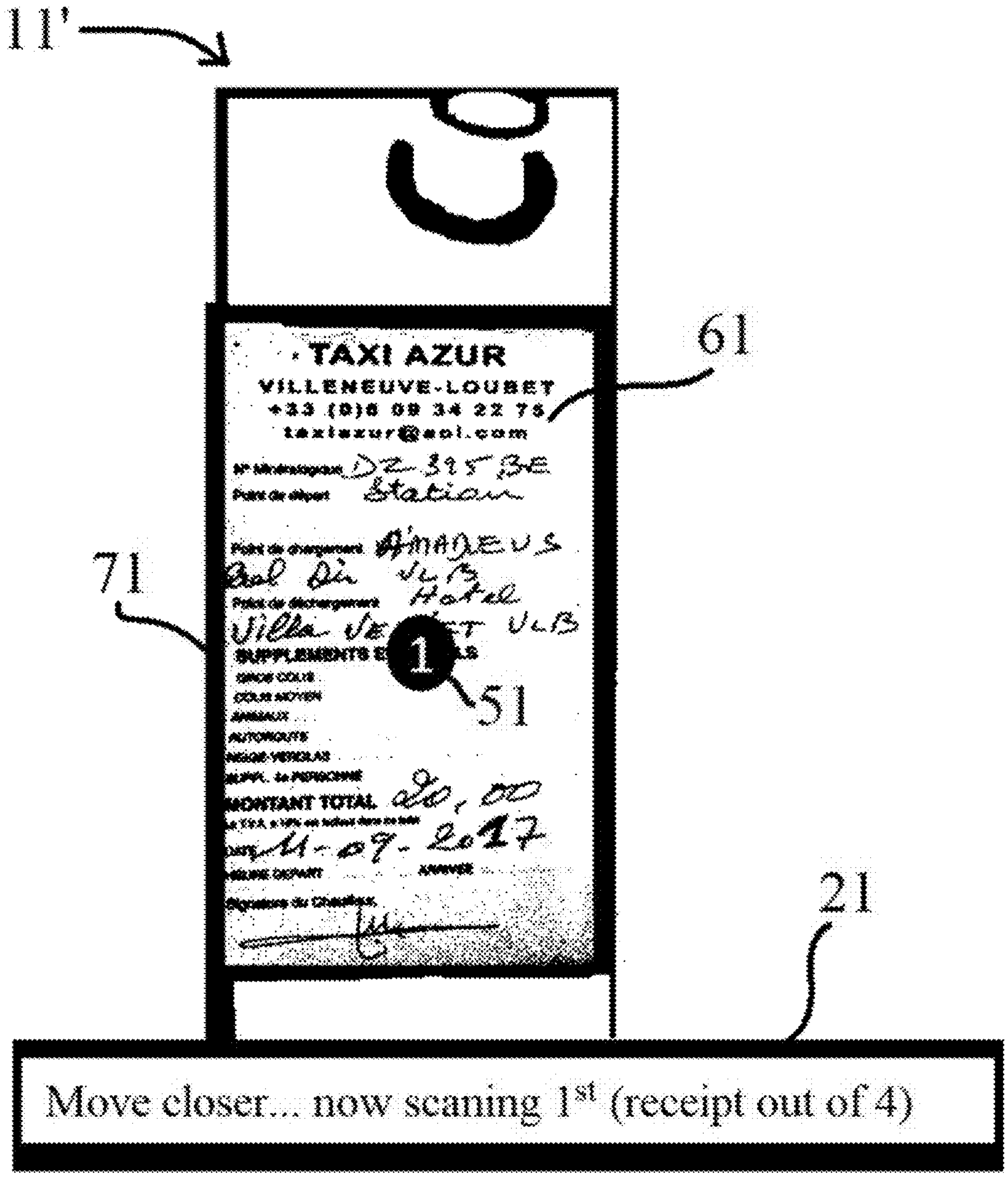
FIG. 7 shows an example of a screen on a user device when scanning four receipts, indicating that the camera should be moved closer to the receipt.

An example of a screen 11' on a user device 1 (see FIG. 1) when scanning four receipts 61, 62, 63, 64, with a command that the camera should be moved closer to the receipt 61 is shown in FIG. 7. In this way, an output line 21 displayed on the screen 11' commands the user to "move closer . . . now scanning 1$^{st}$ (receipt output of 4)".

FIG. 7 shows the screen 11' of the user device 1 (see FIG. 1) when the image is already zoomed to the receipt 61 surrounded by the highlighted object frame 71 on the screen 11'. A number symbol "1" 51 is projected to the center of said frame 71, the number symbol "1" is visible to the user on the screen 11'.

Figure 8:
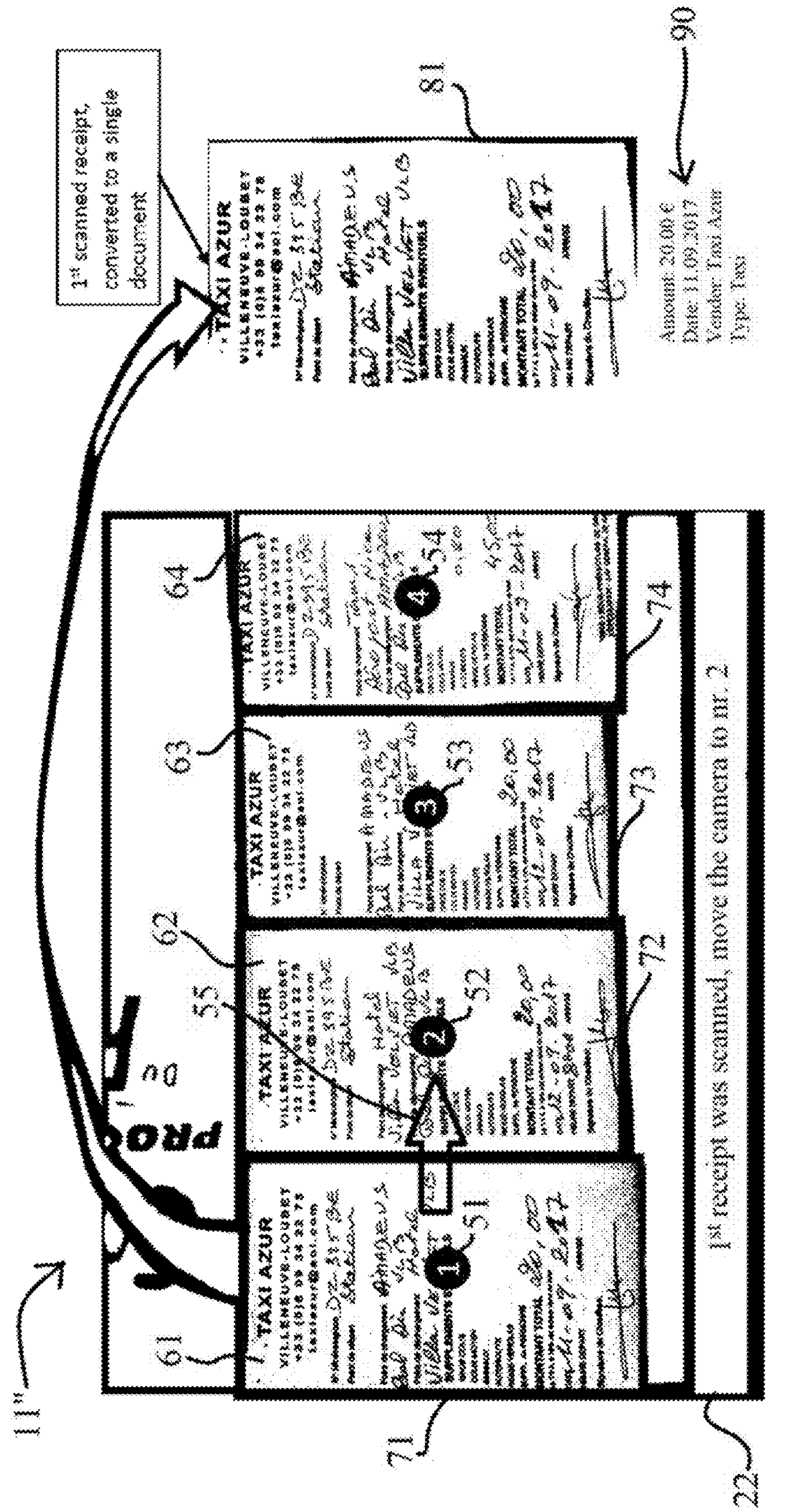
FIG. 8 shows an example of a screen on a user device when scanning four receipts, indicating that the first receipt was scanned and the camera should be moved to the second receipt.

An example of a screen 11" on a user device 1 (see FIG. 1) when scanning four receipts 61, 62, 63, 64, indicating that the first receipt was scanned and the camera should be moved to the second receipt is shown in FIG. 8.

After scanning of the first receipt 61 has been finished an output line 22 is displayed to the user that reads: "1st receipt was scanned, move the camera to nr. 2". The order in which the receipts 61, 62, 63, 64 should be scanned and correspondingly to which the user should move the camera 2 (see FIG. 1), is given by the number symbols "1", "2", "3", "4" 51, 52, 53, 54. Also an arrow 55, displayed via the virtual reality engine, indicates on the screen 11" that the camera should now be moved to receipt nr. 2 (here: receipt 62).

The already scanned first receipt 61 is converted to a single document 81 that may be at least temporarily stored in the user device 1 (see FIG. 1). From this document 81, in a later stage, information 90 is read out, for example, by means of an OCR algorithm and applying semantics analysis (see FIG. 5). In the example illustrated by FIG. 8, at least the following information 90 is eventually read out: Amount: 20.00€, Date: 11 Sep. 2017, Vendor: Taxi Azur, Type: Taxi.

Figure 9:
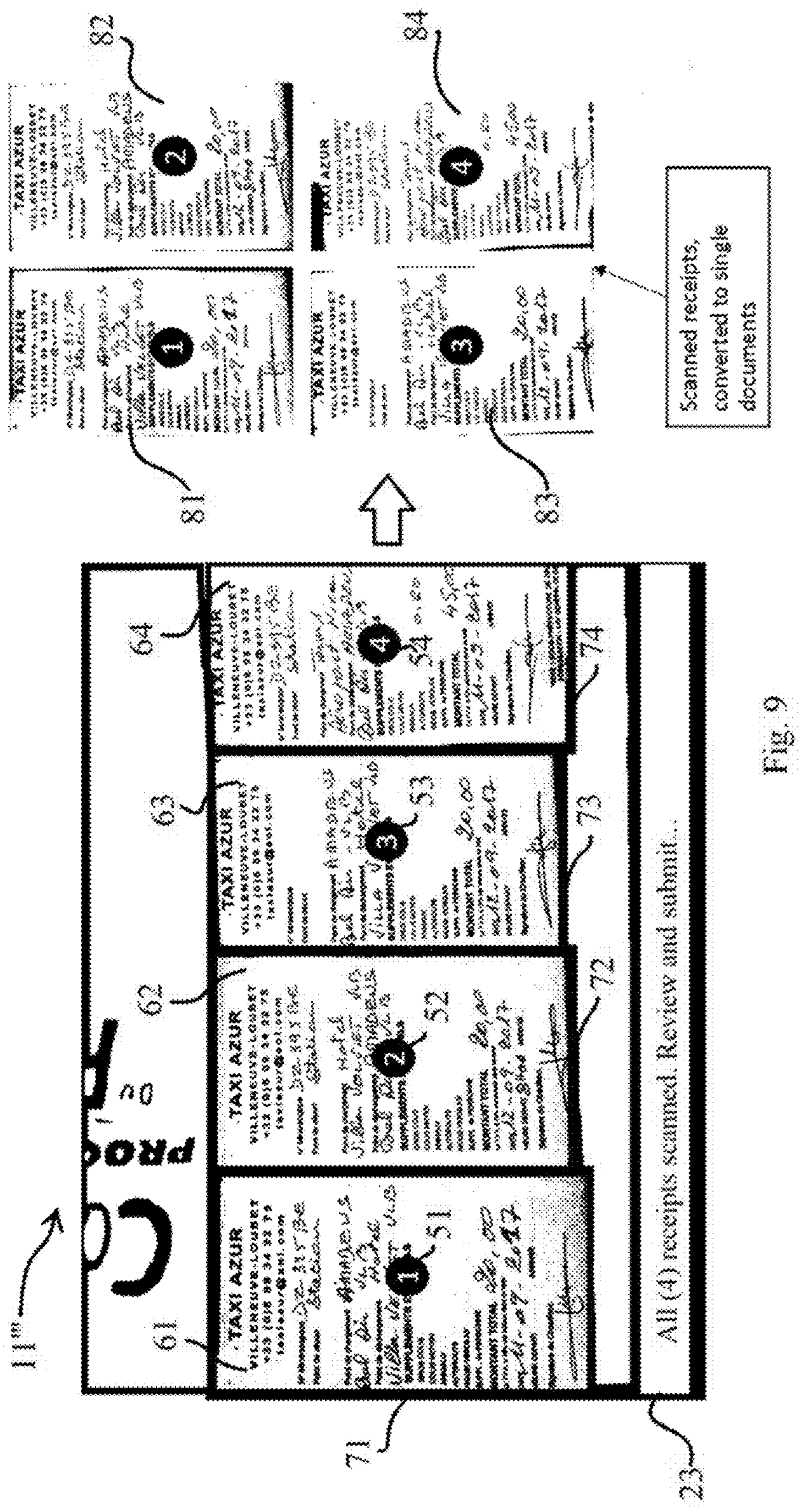
FIG. 9 shows an example of a screen on a user device when scanning four receipts, indicating that all four receipts are scanned and the scan results are displayed for review before submission.

An example of a screen 11" on a user device 1 (see FIG. 1) when scanning four receipts 61, 62, 63, 64, indicating that all four receipts are scanned and the scan results are displayed for review before submission, is shown in FIG. 9.

After all four receipts 61, 62, 63, 64 have been scanned, the output line 23 is displayed to the user, which reads: "All (4) receipt scanned. Review and submit . . . " and thereafter pictures of all the scanned receipts converted to single documents 81, 82, 83, 84 are displayed to the user for review.

After having reviewed the receipts, the user can submit the four scanned documents 81, 82, 83, 84 manually for further processing. As shown in FIG. 8, the further processing may involve applying an OCR algorithm and semantic analysis in order to extract information like the date, the total amount, the vendor's name etc.

Figure 10:
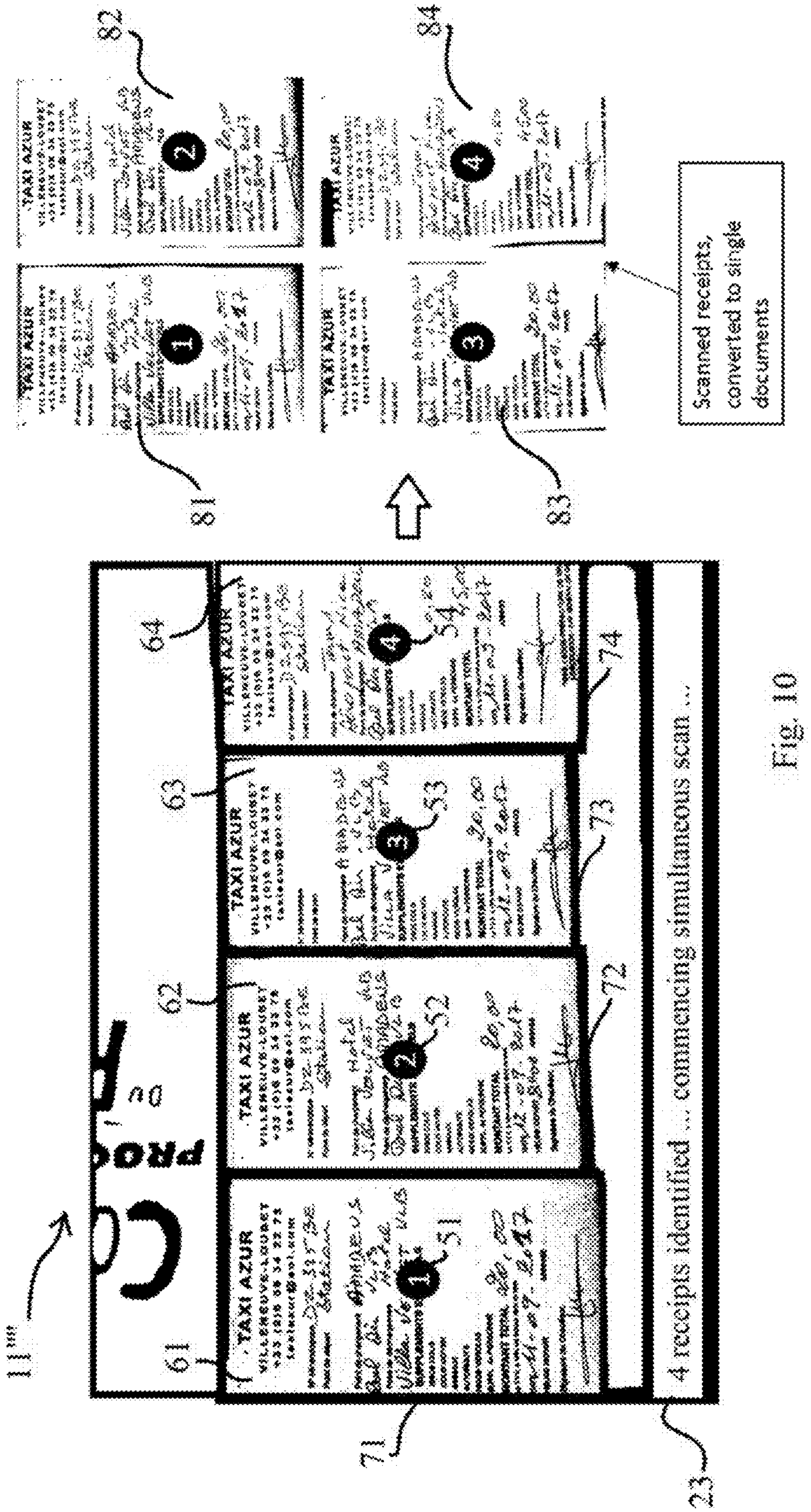
FIG. 10 shows an example of a screen on a user device when scanning four receipts, indicating that a simultaneous scan of all four receipts is carried out.

An example of a screen 11" on a user device 1 (see FIG. 1) when scanning four receipts 61, 62, 63, 64, indicating that a simultaneous scan of all four receipts 61, 62, 63, 64 is carried out is shown in FIG. 10.

The situation illustrated by FIG. 10 is related to examples in which the user is guided to move the camera to an overall scanning position in which at least two paper documents—in the example illustrated by FIG. 10: all four receipts 61, 62, 63, 64—are scanned simultaneously, i.e., a photo is taken of all four receipts 61, 62, 63, 64.

The user is informed about the commencing scan by the output line 23 displayed on the screen 11"": "4 receipts identified . . . commencing simultaneous scan . . . ".

Also in this scenario, the scanned documents 81, 82, 83, 84 may be displayed to the user for review before they are submitted for further processing, as has also been shown in FIG. 9.

Figure 11:
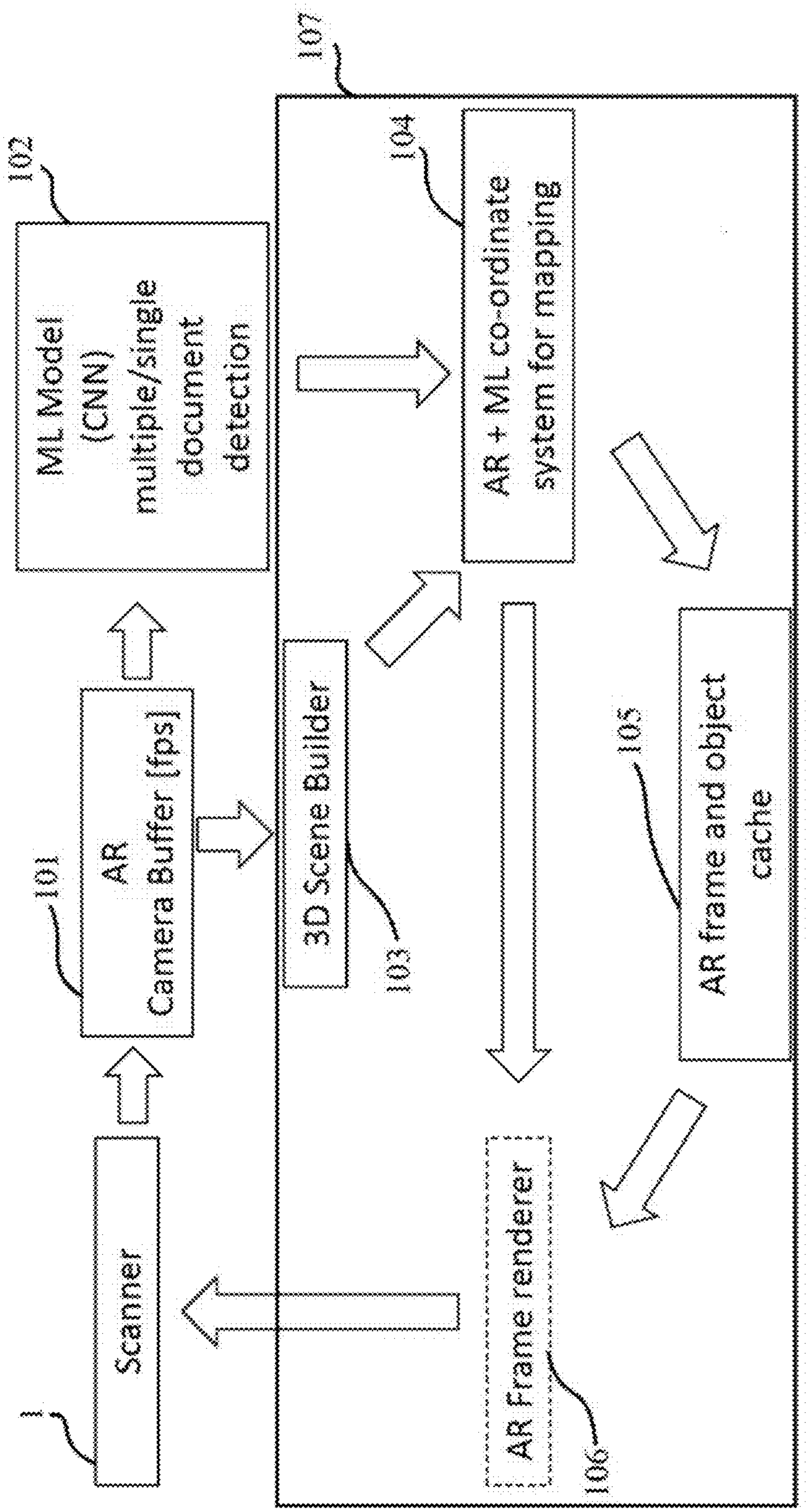
FIG. 11 shows a schematic block diagram illustrating the interaction of a multi-layer neural network model and augmented reality functions.

A schematic block diagram illustrating the interaction of a multi-layer neural network model and augmented reality functions is shown in FIG. 11.

The scanner 1', for example, in the form of user device 1 (see FIG. 1) films the scene before a camera 2 (see FIG. 1) and transmits the pictures obtained to an augmented reality camera buffer 101—from there, the pictures are transmitted to the multi-layer convolutional neural network model 102 for performing single/multiple object detection. As mentioned above, the multi-layer convolutional neural network model identifies corner point coordinates of the paper documents (here: receipts) to be scanned and frames are built around the paper documents using said corner point coordinates. The pictures recorded on the camera buffer 101 are also sent to the augmented reality engine 107, which includes a 3D scene builder 103 to receive said pictures and to build a 3D scene which is augmented by the augmented reality engine 107.

The scene built by the 3D scene builder 103 is used by a coordinate system between the data delivered by the multi-layer neural network (e.g. YOLO objects) and the augmented reality system 104 (referred to in FIG. 11 as the augmented reality (AR)+machine learning (ML) coordinate system for mapping 104), which maps the YOLO object data including corner coordinates received from the multi-layer neural network model to three-dimensional frame coordinates to construct the highlighted object frames 71, 72, 73, 74 (see FIGS. 6 to 10) and 3D objects displayed in the 3D scene to the user.

The highlighted object frames (in FIG. 11 referred to as augmented reality (AR) frame) and 3D objects are stored in an AR frame and object cache 105. From this storage 105, the AR object frames are sent to a frame renderer 106, which is also informed by the AR+ML coordinate system for mapping about the current real-time coordinates of the paper object's corner points in the scene—from which the highlighted object frames 71, 72, 73, 74 (see FIGS. 6 to 10) are built. By receiving this information about the current corner point coordinates, the AR frame renderer 106 can adapt the location in which the highlighted object frames are generated in the scene. This adaption is to accommodate for changes in the camera position during the scan, since moving the camera changes the scene and also the location of the highlighted object frames 71, 72, 73, 74 (see FIGS. 6 to 10) in the scene. By this continuous adaption (e.g. in the order of seconds), the highlighted object frames mark the paper document boundaries also should the camera position change.

The AR frame renderer 106 renders the highlighted object frames according to these continuously adapted 3D frame coordinates, which are then displayed on the display of the scanner 1'.

Figure 12:
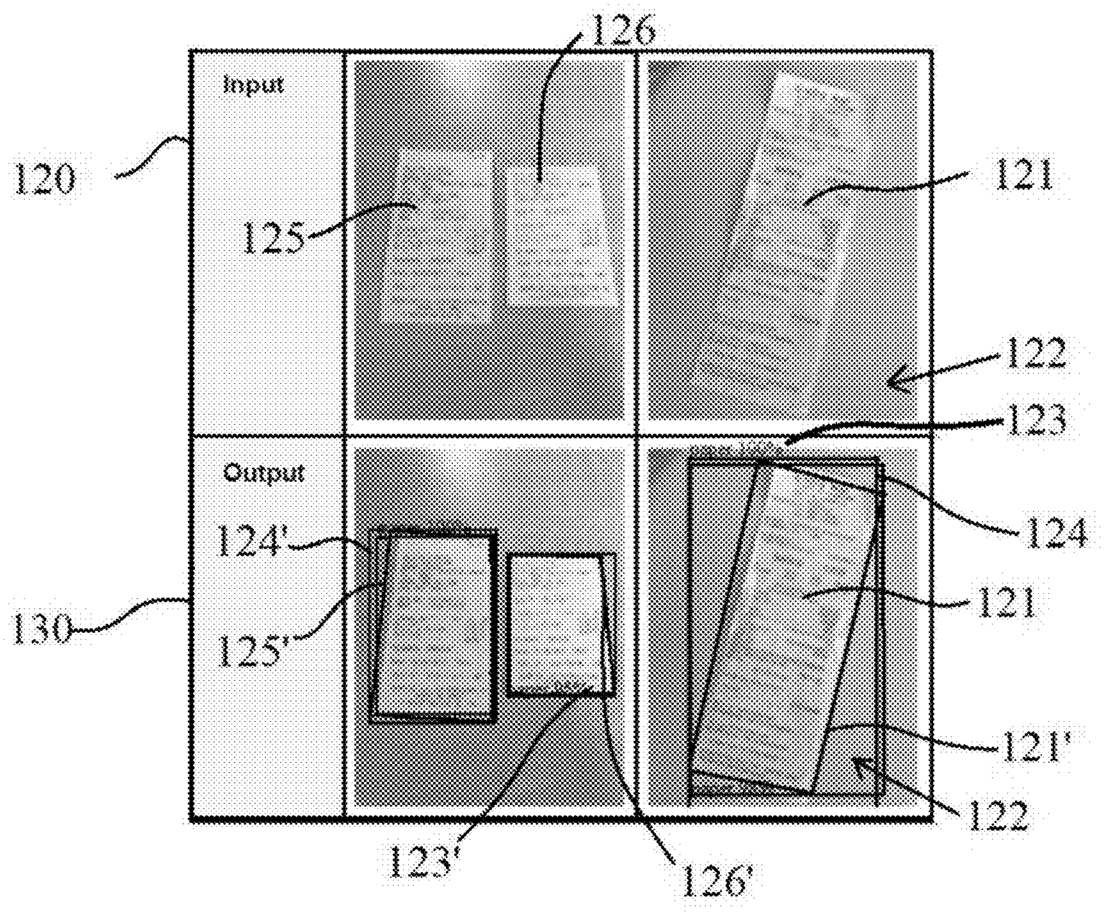
FIG. 12 shows examples of input data and output frames and/or bounding boxes of a modified YOLOv2 algorithm.

Examples of input data and output frames and/or bounding boxes of a modified YOLOv2 algorithm are shown in FIG. 12.

The row 120 of the table illustrated by FIG. 12 shows two different receipts lying side-by-side on the left-hand side oriented straight in the scene and a single receipt 121 on the right-hand side that is slightly rotated relative to the scene. The receipts are placed before a colored background 122. Those receipts represent two possible inputs 120 for applying a YOLOv2 based multi-layer convolutional neural network algorithm.

The output 130 of applying said algorithm is given by: score values 123, 123' indicating the probability that the objects identified are indeed of the paper document class, for the smaller receipt on the left-hand side the score value provided as output by the algorithm is only 95%, whereas the score value for the single receipt on the right-hand side is 100%. A further output is bounding boxes 124, 124' which roughly confine the area in which an object like the receipt is located. A further output, the output of most interest for the method described herein, is frames 121', 125', 126' aligned with the boundaries of the receipts 121, 125, 126.

As can be taken by a comparison of the bounding boxes 124, 124' and the frames 121', 125', 126', the area selected by the frames is better aligned with the boundaries of the receipts than the bounding boxes. In particular, also the boundaries of the receipt 121 that is rotated relative to the scene are marked correctly by the frame polygon, since the frame is rotated in the scene the same way as the receipt. The bounding box 124, however, is non-rotated and therefore includes also plenty of scene background 122 is covered by the bounding boxes', whereas the background 122 is cut out by the constructed frames 121', 125', 126'.

When a further processing step like OCR or semantic analysis is applied to the area of the scanned receipts defined by the frames 121', 125', 126' these algorithms may work faster, with higher computation resource efficiency and/or higher accuracy. Furthermore, the rotation of the document relative to the scene may be automatically detected and corrected in a post-processing step.

Figure 13:
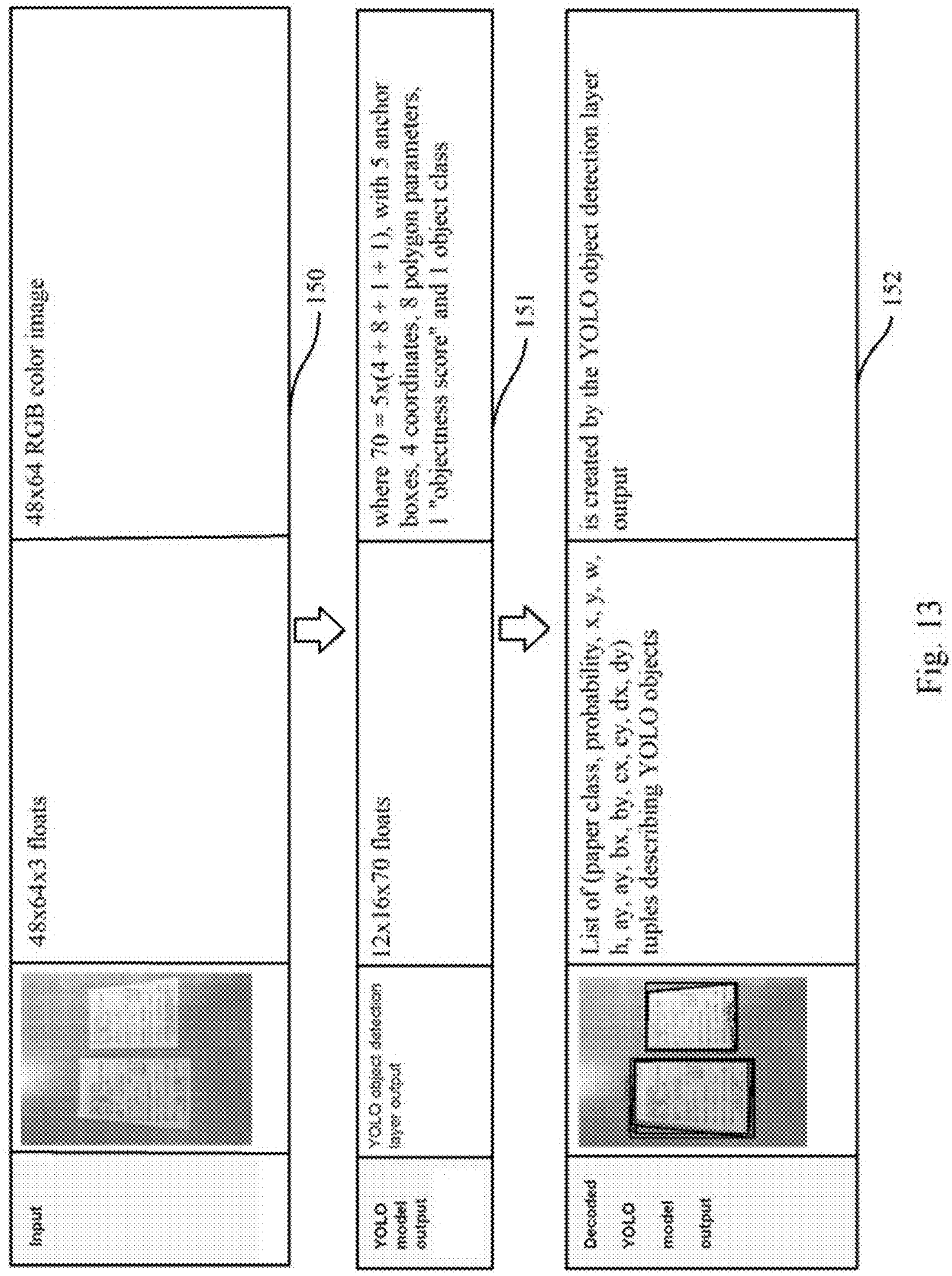
FIG. 13 shows an example of a mapping from filmed receipts as inputs to customized YOLO objects.

An example of a mapping from filmed receipts as inputs to customized YOLO objects is shown in FIG. 13.

As mentioned already in the "general description", the YOLO neural network architecture is an example only, the method described herein could be carried out by a properly trained MobileNet neural network architecture or other properly trained neural network architectures as well.

The formal definition of the problem is in this example: Map 48×64×3 floats onto 12×16×70 (customized YOLO object detection layer result for 12×16 cells, 5 priors and 1 class). Then decode the YOLO object detection layer and extract a list of detected customized polygon YOLO objects.

In this example, an input of 48×64×3 floats of an 48×64 RGB color image is used. The YOLO object detection layer output 151 is, in this example, given by 12×16×70 floats, wherein the third-dimension value of 70 is given here by 70=5×(4+8+1+1) with 5 anchor boxes, 4 coordinates, 8 polygon parameters, 1 "objectness score" and 1 object class.

The decoded YOLO model output 152 is a list of: (paper class, probability, x, y, w, h, ax, ay, bx, by, cx, cy, dx, dy) tuples describing the YOLO objects. The list is created by decoding the YOLO object detection layer output. As described above, the paper class is an information that the object is a member of the class "paper", the probability is the probability that the detected object is indeed a paper document, the boundaries x, y, w, h are the location, width and height of a bounding box around the paper document, the coordinates ax, ay, bx, by, cx, cy, dx, dy are the two-dimensional (x, y) coordinates of the frame corner points (marking the corner points of the paper document) a, b, c, d identified.

Figure 14:
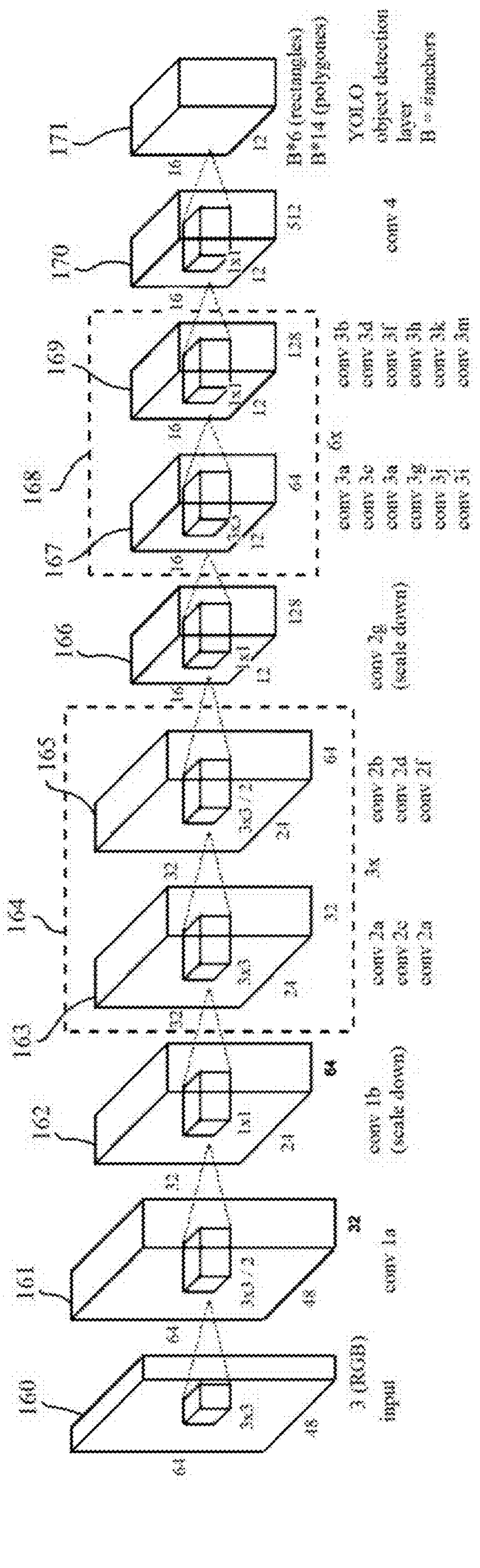
FIG. 14 shows an example of a multi-layer neural network architecture including a YOLO object detection layer, FIG. 15A/15B show a flowchart of an example of the method of scanning two or more paper documents for further processing, when single receipts are scanned successively, FIG. 16A/16B show a flowchart of an example of the method of scanning two or more paper documents for further processing, when two or more receipts are scanned simultaneously.

An example of a multi-layer neural network architecture including a YOLO object detection layer, to create the above-described YOLO object output is shown in FIG. 14.

As mentioned above, in this example, the model is made up of convolutional layers only and therefore called fully convolutional. The model is independent of the input image size, that is, a trained model could be used for differently shaped input images without re-training.

The first part of the model 160 to 170 (up to "conv 4") is called backend model. It can potentially be replaced by any other model which produces a similar output with shape 12×16×N.

The second part of the model 171 is called frontend model and its purpose is to reshape the output of the backend model (12×16×N) into the shape required by the YOLOv2 method (12×16×70).

The model illustrated by FIG. 14, in total comprises the layers Input 160, conv 1*a* 161, conv 1*b* (scale down) 162, convolutional layers conv 2*a* to conv 2*f* 164 being divided into two sub layers 163,165, conv 2*g* (scale down) 166, convolutional layers conv 3*a* to conv 3*m* 168 being divided into two sub-layers 167, 169 and conv 4 170.

The final layer 171 is the YOLO object detection layer, in which the above-described YOLO objects are determined.

Figure 15A:
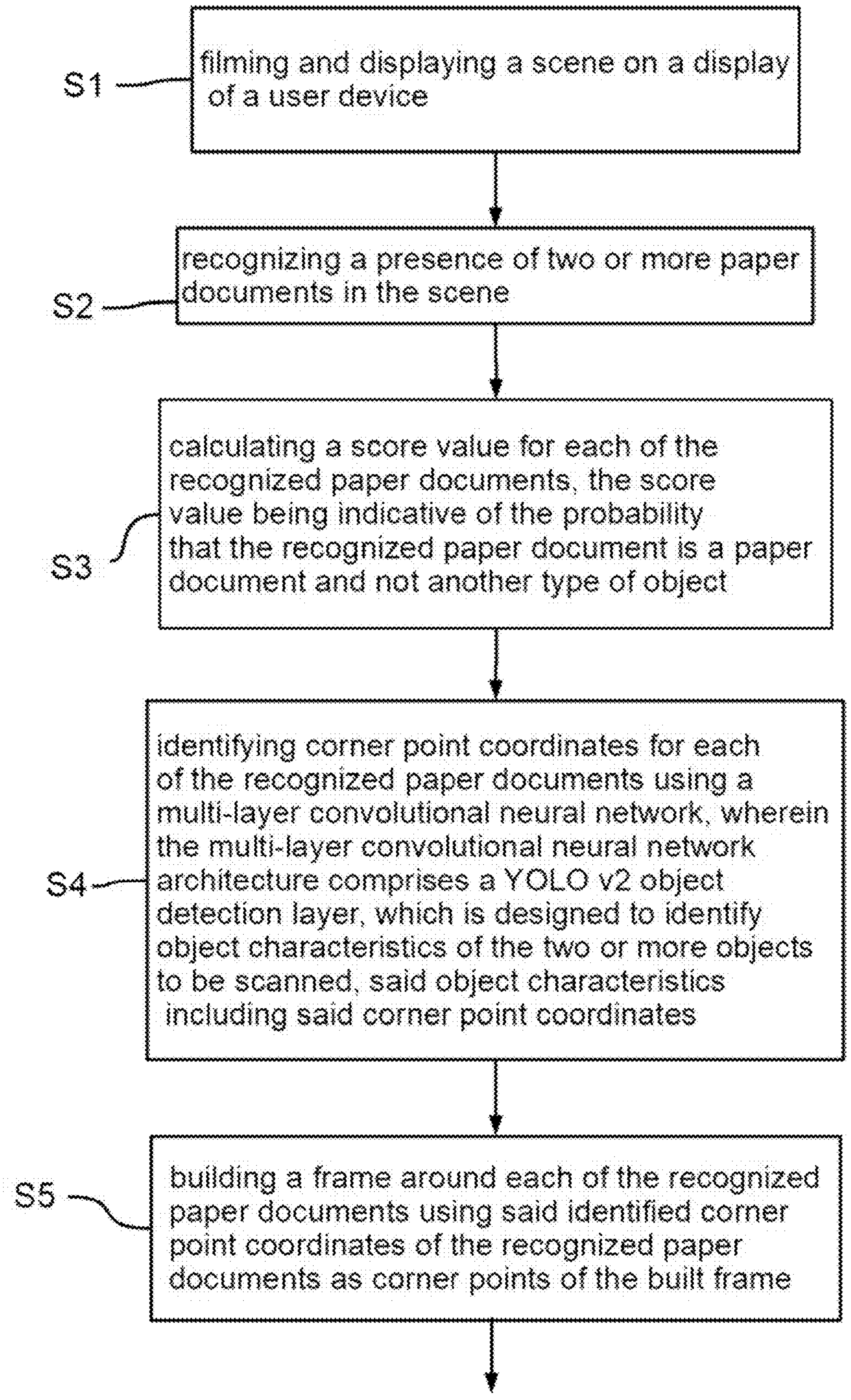
Figure 15B:
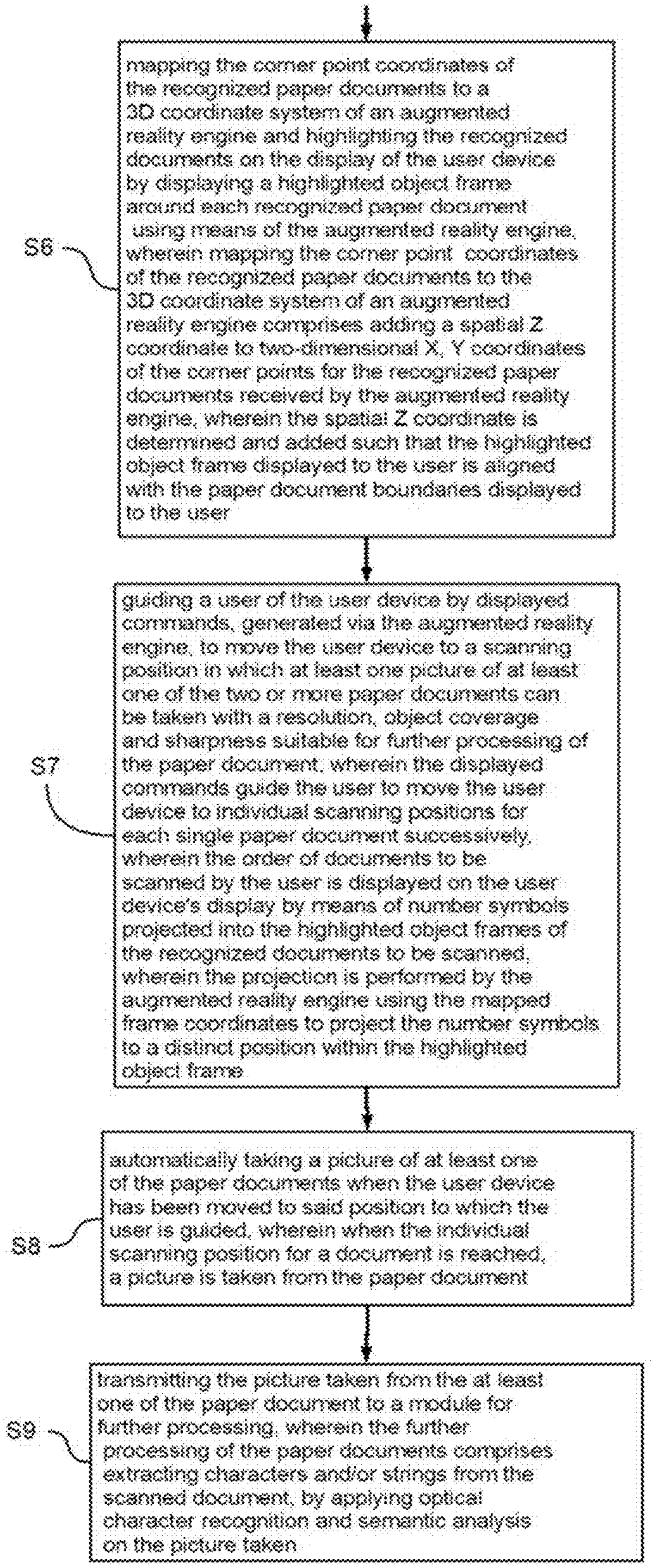

A flowchart of an example of the method of scanning two or more paper documents for further processing, when single receipts are scanned successively is shown in FIGS. 15A/15B.

An activity S1 of the method includes filming and displaying a scene on a display of a user device. This is followed by an activity of S2 of recognizing a presence of two or more paper documents in the scene and an activity S3 of calculating a score value for each of the recognized paper documents, the score value being indicative of the probability that the recognized paper document is a paper document and not another type of object.

Then an activity S4 of identifying corner point coordinates for each of the recognized paper documents using a multi-layer convolutional neural network takes place, wherein the multi-layer convolutional neural network architecture comprises a YOLOv2 object detection layer, which is designed to identify object characteristics of the two or more objects to be scanned, said object characteristics including said corner point coordinates.

This activity is followed by an activity S5 of building a frame around each of the recognized paper documents using said identified corner point coordinates of the recognized paper documents as corner points of the built frame.

Subsequent activity S6 includes mapping the corner point coordinates of the recognized paper documents to a 3D coordinate system of an augmented reality engine and highlighting the recognized documents on the display of the user device by displaying a highlighted object frame around each recognized paper document using means of the augmented reality engine, wherein mapping the corner point coordinates of the recognized paper documents to the 3D coordinate system of an augmented reality engine comprises adding a spatial Z coordinate to two-dimensional X, Y coordinates of the corner points for the recognized paper documents received by the augmented reality engine, wherein the spatial Z coordinate is determined and added such that the highlighted object frame displayed to the user is aligned with the paper document boundaries displayed to the user.

This is followed by an activity S7 of guiding a user of the user device by displayed commands, generated via the augmented reality engine, to move the user device to a scanning position in which at least one picture of at least one of the two or more paper documents can be taken with a resolution, object coverage and sharpness suitable for further processing of the paper document, wherein the displayed commands guide the user to move the user device to individual scanning positions for each single paper document successively, wherein the order of documents to be scanned by the user is displayed on the user device's display by means of number symbols projected into the highlighted object frames of the recognized documents to be scanned, wherein the projection is performed by the augmented reality engine using the mapped frame coordinates to project the number symbols to a distinct position within the highlighted object frame.

Subsequently activity S8 of automatically taking a picture of at least one of the paper documents when the user device has been moved to said position to which the user is guided, wherein when the individual scanning position for a document is reached, a picture is taken from the paper document.

Figure 16A:
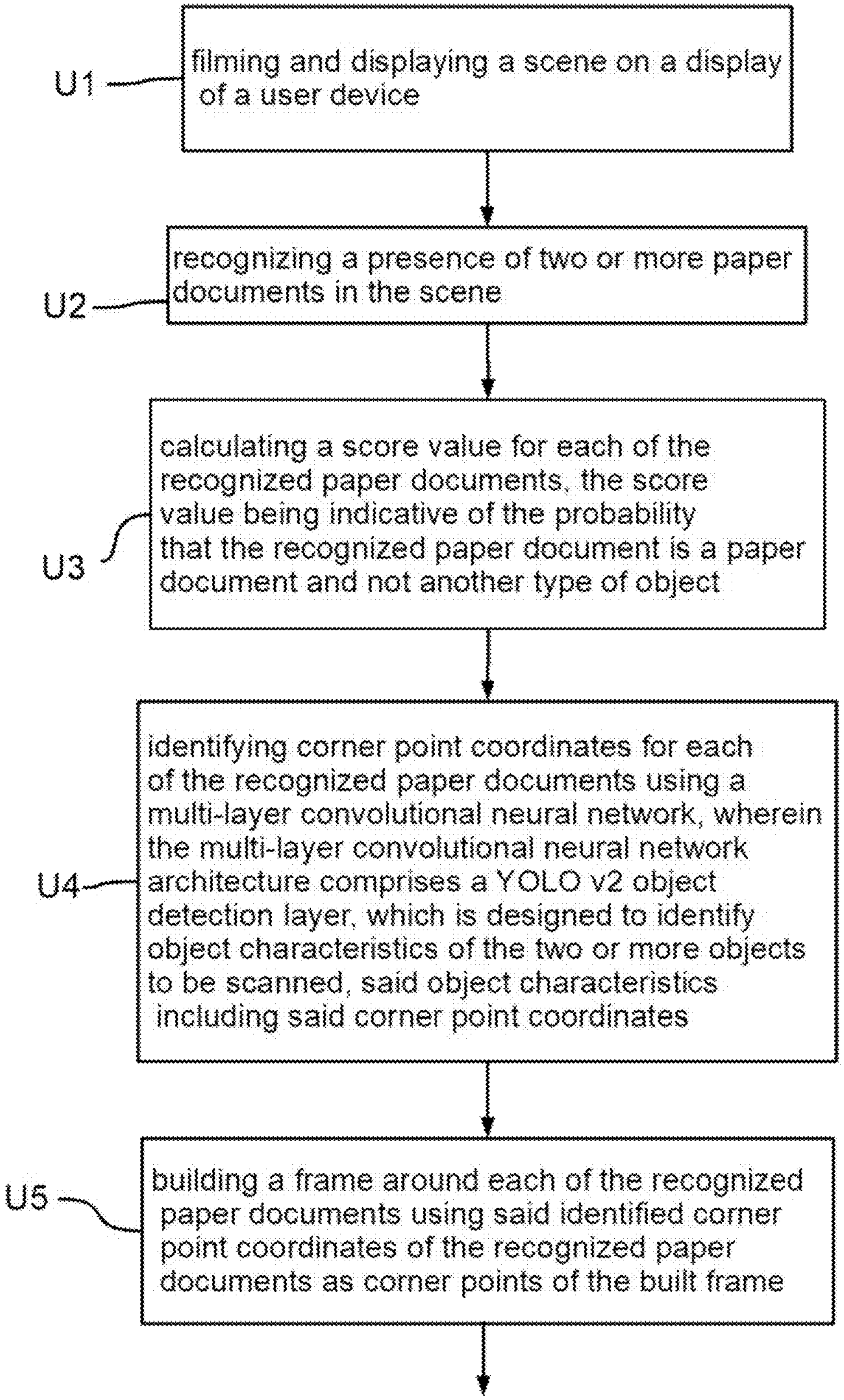
Figure 16B:
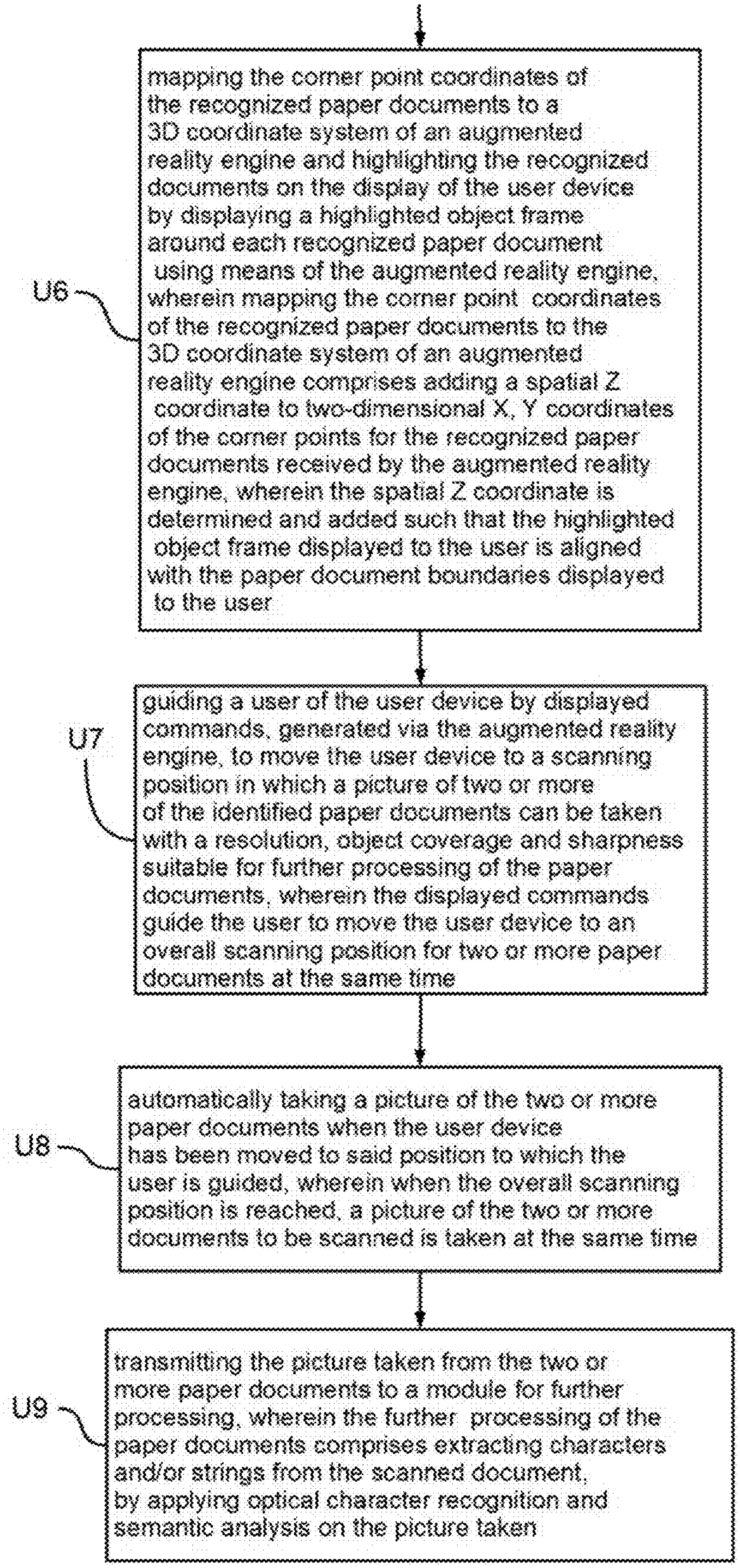

Eventually, an activity S9 of transmitting the picture taken from the at least one of the paper documents to a module for further processing takes place, wherein the further processing of the paper documents comprises extracting characters and/or strings from the scanned document, by applying optical character recognition and semantic analysis on the picture taken. A flowchart of an example of the method of scanning two or more paper documents for further processing, when two or more receipts are scanned simultaneously, is shown in FIGS. 16A/16B. The activities illustrated in the flow chart of FIGS. 16A and 16B correspond to the above-described activities illustrated by FIGS. 15A and 15B, except for the activities U7 to U9, which occur after the highlighted frames have been calculated and displayed around the boundaries of the paper documents.

The activities U7 to U9 are performed instead of guiding the user to individual scanning positions at which individual pictures of single documents are automatically taken and transmitted for further processing. These activities are further described below:

Activity U7 includes guiding a user of the user device by displayed commands, generated via the augmented reality engine, to move the user device to a scanning position in which a picture of two or more of the identified paper documents can be taken with a resolution, object coverage and sharpness suitable for further processing of the paper documents, wherein the displayed commands guide the user to move the user device to an overall scanning position for two or more paper documents at the same time.

The subsequently performed activity U8 includes automatically taking a picture of at least one of the two or more paper documents when the user device has been moved to said position to which the user is guided, wherein when the overall scanning position is reached, a picture of the two or more documents to be scanned is taken at the same time.

Finally, activity U9 is performed, which includes transmitting the picture taken from the two or more paper documents to a module for further processing, wherein the further processing of the paper documents comprises extracting characters and/or strings from the scanned document, by applying optical character recognition and semantic analysis on the picture taken.

Figure 17:
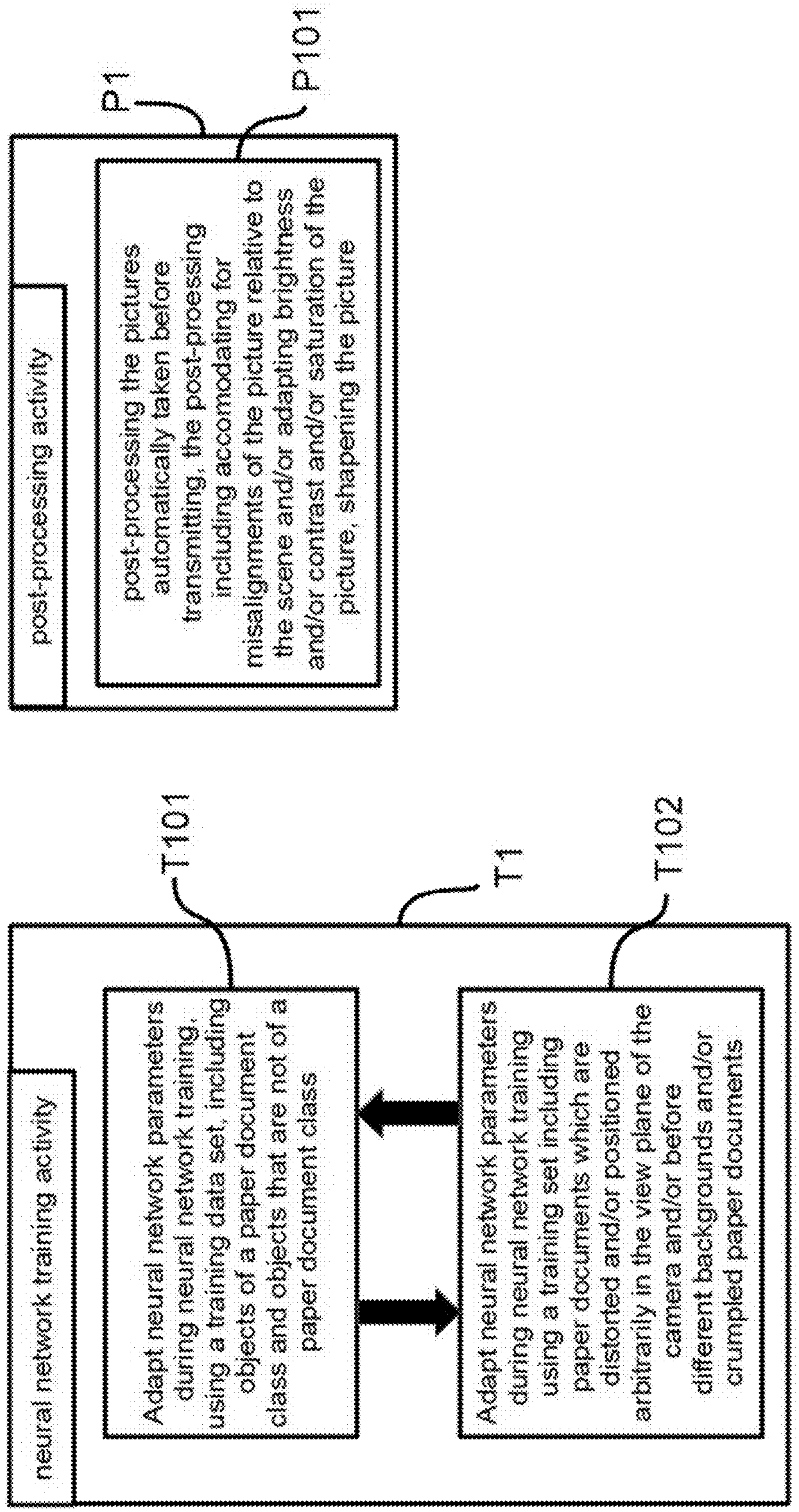
FIG. 17 shows a flowchart of an example of a training method for the multi-layer convolutional neural network and post-processing applied in the method of scanning two or more paper documents for further processing.

A flowchart of an example of a training method for the multi-layer convolutional neural network and post-processing applied in the method of scanning two or more paper documents for further processing, is shown in FIG. 17.

An activity T101 of a neural network training activity, includes adapting neural network parameters during the neural network training, using a training data set, including objects of a paper document class, e.g. receipts and objects that are not of a paper document class, e.g. book covers, napkins, leaves etc.

In a further activity T102 the neural network parameters are adapted during neural network training using a training set including paper documents which are distorted and/or positioned arbitrarily in the view plane of the camera, e.g. rotated relative to the field of view plane of the camera and/or before different backgrounds and/or crumpled paper documents.

Please note that the field of view plane of the camera corresponds to what is also referred to as "scene" in this application.

The adaptations of the neural network parameters according to training activity T101 may form the basis of the neural network parameters with which the training activity T102 starts and vice versa.

A post-processing activity P101 is also shown in FIG. 17 that is applied after a picture has been taken of a paper document or a plurality of paper documents to be further processed. The post-processing activity 101 involves accommodating for misalignments of the pictures relative to the scene and/or adapting brightness and/or contrast and/or saturation of the picture, as well as sharpening the picture.

As described above, the post-processing activity 101 may further include applying optical filters to the picture content (not shown in FIG. 17). Accommodating for misalignments may include rotating back the picture to remove a rotation of the picture relative to the scene or applying a correction of the perspective if the paper document was placed slantwise relative to the camera etc.

Figure 18:
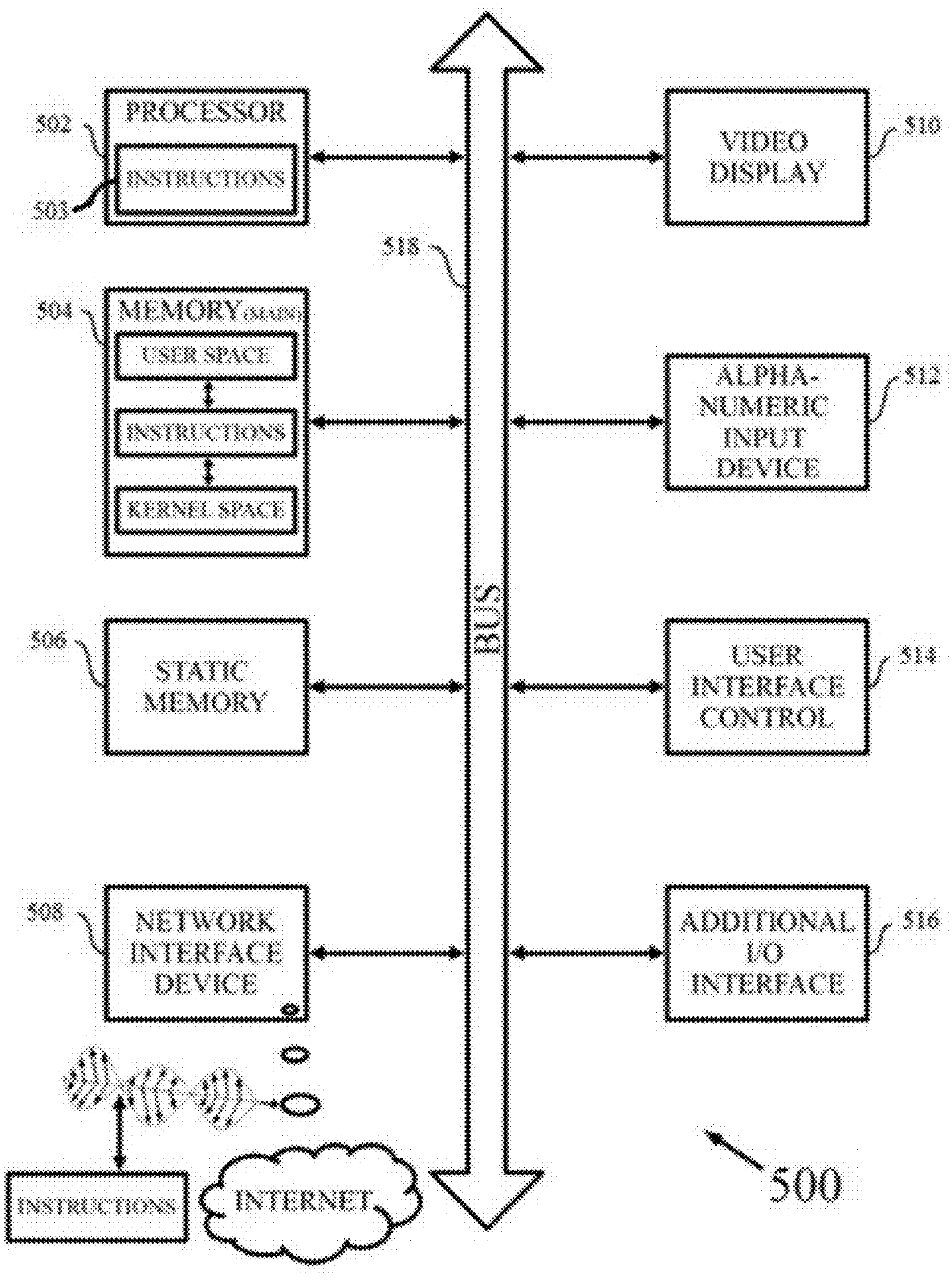
FIG. 18 shows a schematic computerized system on which the methods illustrated by FIGS. 2 to 17 could be implemented.

A diagrammatic representation of an exemplary computer system 500 is shown in FIG. 18. The processor 502 is arranged to execute a set of instructions 503, to cause the computer system 500 to perform any of the methodologies used for the method of scanning two or more paper documents for further processing, as described herein. The mobile device 1 (see FIG. 1) might be arranged like this.

The computer system 500 includes a processor 502, a main memory 504 and a network interface 508. The main memory 504 includes a user space, which is associated with user-run applications, and a kernel space, which is reserved for operating-system- and hardware-associated applications. The computer system 500 further includes a static memory 506, e.g. non-removable flash and/or solid-state drive and/or a removable Micro or Mini SD card, which permanently stores software enabling the computer system 500 to execute functions of the computer system 500. Furthermore, it may include a video display 510, a user interface control module 514 and/or an alpha-numeric and cursor input device 512. Optionally, additional I/O interfaces 516, such as card reader and USB interfaces may be present. The computer system components 502 to 516 are interconnected by a data bus 518.

In some exemplary embodiments the software programmed to carry out the method described herein is stored on the static memory 506; in other exemplary embodiments, external databases are used.

An executable set of instructions (i.e. software) 503 embodying any one, or all, of the methodologies described above, resides completely, or at least partially, permanently in the non-volatile memory 506. When being executed, process data resides in the main memory 504 and/or the processor 502.

The invention claimed is:

1. A method of scanning one or more paper documents for further processing, the method comprising:

filming and displaying a scene on a display of a user device, recognizing a presence of one or more paper documents in the scene, identifying corner point coordinates for each of the recognized paper documents using a multi-layer convolutional neural network, building a frame around each of the one or more recognized paper documents using the identified corner point coordinates of the recognized paper documents as corner points of the built frame, mapping the corner point coordinates of the one or more recognized paper documents to a 3D coordinate system of an augmented reality engine and highlighting the one or more recognized paper documents on the display of the user device by displaying a highlighted object frame around each recognized paper document using means of the augmented reality engine, guiding a user of the user device by displayed commands, generated via the augmented reality engine, to move the user device to a scanning position in which at least one picture of at least one of the one or more paper documents can be taken with a resolution, object coverage and sharpness suitable for further processing of the at least one paper document, automatically taking a picture of at least one of the paper documents when the user device has been moved to the position to which the user is guided, and transmitting the picture taken from the at least one of the paper documents to a module for further processing.

2. The method of claim 1, wherein the user device is a smartphone equipped with a camera.

3. The method of claim 1, wherein the method is used for scanning two or more paper documents for further processing.

4. The method of claim 1, wherein the further processing of the paper documents comprises extracting one or more of characters and strings from the scanned document, by applying optical character recognition and semantic analysis on the picture taken.

5. The method of claim 1, wherein the multi-layer convolutional neural network architecture comprises a YOLOv2 object detection layer, which is designed to identify object characteristics of the one or more objects to be scanned, the object characteristics including the corner point coordinates for the two or more recognized paper documents.

6. The method of claim 1, wherein a training data set is used to train the multi-layer convolutional neural network that comprises objects that are members of a paper document class and objects that are not of a paper document class.

7. The method of claim 1, wherein the multi-layer convolutional neural network is trained with a training set including paper documents, wherein the paper documents are one or more of: distorted; positioned arbitrarily in the field of view plane of the camera; positioned arbitrarily before different backgrounds; and crumpled.

8. The method of claim 1, wherein the method further comprises post-processing the pictures automatically taken before transmitting, wherein the post-processing comprises one or more of: accommodating for misalignments of the picture taken relative to the scene; adapting brightness of the picture taken; adapting contrast of the picture taken; adapting saturation of the picture taken; and sharpening the picture taken.

9. The method of claim 1, wherein mapping the corner point coordinates of the recognized one or more paper documents to the 3D coordinate system of an augmented reality engine comprises adding a spatial Z coordinate to two-dimensional X, Y coordinates of the corner points for the recognized one or more paper documents received by the augmented reality engine, wherein the spatial Z coordinate is determined and added such that the highlighted object frame displayed to the user is aligned with the paper document boundaries displayed to the user.

10. The method of claim 1, wherein the method further comprises calculating a score value for each of the recognized one or more paper documents, the score value being indicative of the probability that the recognized paper document is a paper document and not another type of object.

11. The method of claim 1, wherein the displayed commands guide the user to move the user device to individual scanning positions for each single paper document successively, and wherein automatically taking a picture comprises, when the individual scanning position for a document is reached, taking a picture from the paper document.

12. The method of claim 11, wherein the order of documents to be scanned by the user is displayed on the user device's display by means of number symbols projected into the highlighted object frames of the recognized documents to be scanned, wherein the projection is performed by the augmented reality engine using the mapped frame coordinates to project the number symbols to a distinct position within the highlighted object frame.

13. The method of claim 1, wherein the displayed commands guide the user to move the user device to an overall scanning position for two or more paper documents at the same time.

14. A mobile user device to scan one or more paper documents for further processing, the user device comprising at least one processor and at least one non-volatile memory comprising at least one computer program with executable instructions stored therein, the executable instructions, when executed by the at least one processor, being configured to cause the at least one processor to:

film and display a scene on a display of a user device, recognize a presence of one or more paper documents in the scene, identify corner point coordinates for each of the recognized paper documents using a multi-layer convolutional neural network, build a frame around each of the one or more recognized paper documents using the identified corner point coordinates of the recognized paper documents as corner points of the built frame, map the corner point coordinates of the one or more recognized paper documents to a 3D coordinate system of an augmented reality engine and highlight the one or more recognized documents on the display of the user device by displaying a highlighted object frame around each recognized paper document using means of the augmented reality engine, guide a user of the user device by displayed commands, generated via the augmented reality engine, to move the user device to a filming position in which at least one picture of at least one of the one or more paper documents can be taken with a resolution, object coverage and sharpness suitable for further processing of the at least one paper document, automatically take a picture of at least one of the paper documents when the user device has been moved to the position to which the user is guided to, and transmit the picture taken from the at least one of the paper documents to a module for further processing.

15. The user device of claim 14, wherein the user device is a smartphone equipped with a camera.

16. A computer program product comprising program code instructions stored on a non-transitory computer readable medium to execute the method steps according to claim 1, when the program is executed on a computer device.

* * * * *